(12) United States Patent
Boneh et al.

(10) Patent No.: US 7,113,594 B2
(45) Date of Patent: Sep. 26, 2006

(54) SYSTEMS AND METHODS FOR IDENTITY-BASED ENCRYPTION AND RELATED CRYPTOGRAPHIC TECHNIQUES

(75) Inventors: Dan Boneh, Palo Alto, CA (US); Matthew Franklin, Davis, CA (US)

(73) Assignees: The Board of Trustees of the Leland Stanford University, Stanford, CA (US); University of California Davis, Oakland, CA (US)

( * ) Notice: Subject to any disclaimer, the term of this patent is extended or adjusted under 35 U.S.C. 154(b) by 863 days.

(21) Appl. No.: 10/218,697

(22) Filed: Aug. 13, 2002

(65) Prior Publication Data

US 2003/0081785 A1    May 1, 2003

Related U.S. Application Data

(60) Provisional application No. 60/311,946, filed on Aug. 13, 2001.

(51) Int. Cl.
*H04K 1/00* (2006.01)
*H04L 9/00* (2006.01)

(52) U.S. Cl. .......................... 380/28; 380/30; 380/277; 380/280

(58) Field of Classification Search .................. 380/28, 380/277, 30, 280
See application file for complete search history.

(56) References Cited

U.S. PATENT DOCUMENTS 4,405,829 A    9/1983  Rivest et al. .............. 178/22.1

(Continued)

FOREIGN PATENT DOCUMENTS

JP    2002-26892    1/2002

WO    WO 02/51066    6/2002

OTHER PUBLICATIONS

Voltage Security, "What Is Identity-Based Encryption (IBE)?", http://www.voltage.com/technology/ibe.htm, 2004-2005, pp. 1-3.*
Baek et al., "A Survey of Identity-Based Cryptography", School of Information Technology and Computer Science, University of Wollongong, http://jan.netcomp.monash.edu.au/publications / auug_id_survey.pdf, pp. 1-10.*

(Continued)

*Primary Examiner*—Matthew Smithers
*Assistant Examiner*—Courtney Fields
(74) *Attorney, Agent, or Firm*—Lumen Intellectual Property Services, Inc.

(57) ABSTRACT

A method and system for encrypting a first piece of information M to be sent by a sender [100] to a receiver [110] allows both sender and receiver to compute a secret message key using identity-based information and a bilinear map. In a one embodiment, the sender [100] computes an identity-based encryption key from an identifier ID associated with the receiver [110]. The identifier ID may include various types of information such as the receiver's e-mail address, a receiver credential, a message identifier, or a date. The sender uses a bilinear map and the encryption key to compute a secret message key $g_{ID}^r$, which is then used to encrypt a message M, producing ciphertext V to be sent from the sender [100] to the receiver [110] together with an element rP. An identity-based decryption key $d_{ID}$ is computed by a private key generator [120] based on the ID associated with the receiver and a secret master key s. After obtaining the private decryption key from the key generator [120], the receiver [110] uses it together with the element rP and the bilinear map to compute the secret message key $g_{ID}^r$, which is then used to decrypt V and recover the original message M. According to one embodiment, the bilinear map is based on a Weil pairing or a Tate pairing defined on a subgroup of an elliptic curve. Also described are several applications of the techniques, including key revocation, credential management, and return receipt notification.

82 Claims, 12 Drawing Sheets

U.S. PATENT DOCUMENTS

| | | | | |
|---|---|---|---|---|
| 4,748,668 | A | 5/1988 | Shamir et al. | 380/30 |
| 5,016,276 | A | 5/1991 | Matumoto et al. | 380/45 |
| 5,159,632 | A | 10/1992 | Crandall | 380/28 |
| 5,271,061 | A | 12/1993 | Crandall | 380/28 |
| 5,272,755 | A | 12/1993 | Miyaji et al. | 380/30 |
| 5,581,616 | A | 12/1996 | Crandall | 380/28 |
| 6,061,448 | A | 5/2000 | Smith et al. | 380/21 |
| 6,886,096 | B1 * | 4/2005 | Appenzeller et al. | 713/182 |
| 2002/0076042 | A1 | 6/2002 | Sandhu et al. | 380/30 |

OTHER PUBLICATIONS

Adi Shamir, "Identity-based cryptosystems and signature schemes," in Advances in Cryptology—Crypto '84, Lecture Notes in Computer Science, vol. 196, Springer-Verlag, pp. 47-53, 1984.

R. Sakai et al., "Cryptosystems based on pairings," SCIS 2001, Okinawa, Japan.

Antoine Joux, "A one round protocol for tripartite diffie-hellman," Proc. Fourth Algorithmic Number Theoy Symposium, Lecutre Notes in Computer Science, vol. 1838, Springer-Verlag, pp. 385-394, 2000.

D. Boneh et al., "Identity based encryption form the Weil pairing," Extended Abstract in Advances in Cryptology—Crypto 2001, Lecture Notes in Computer Science, vol. 2139 Spring-Verlag, pp. 231-229, 2001.

Ueli M. Maurer et al., "Non-interactive public-key cryptography," Proceedings Eurocrypt '91.

Clifford Cocks, "An identity based encryption scheme based on quadratic residues," Proceedings IMA, Dec. 2001.

Hatsukazu Tanaka, "A realization scheme for the identity-based cryptosystem," Proceedings Crypts '87.

Xuejia Lai et al., "A proposal for a new block encryption standard," Reprint of pp. 389-404 in Advances in Crytology-Eurocrypt '90 Proceedings, LNCS 473, Springer-Verlag, 1991.

Boneh-Franklin et al. "IBE Secure E-mail" Last update: Apr. 8, 2002, retrieved on Aug. 12, 2002. Retrieved from the internet: < URL: http://www.crypto.stnaford.edu>.

Jeremy Horwitz et al., "Toward hierarchical identity-based encryption," Lecture Note in Computer Science, 2002, 2332 466-481.

Joux, Antoine "A One Round Protocol For Tripartite Diffle-Hellman" (2000) W. Bosma (ed.) pp. 385-393.

Koblitz, Neal "Elliptic Curve Cryptosystems" (1986) Mathematics Subject Classification; pp. 203-209.

Paterson, Kenneth G. in a paper "ID-Based Signatures From Pairing on Elliptic Curbes".

Sakai, Ryuichi et al. in a paper "Crypt Shemes Based on Weil Pairing".

Sakai, Ryuichi et al. in a paper "Cryptosystems Based on Pairing" (2000) SCIS.

Sakai, Ryuichi et al. in a paper "Cryptosystems Based on Pairing Over Elliptic Curve" (2001) SCIS.

$3_{rd}$ Party Letter, Jan. 17, 2006.

Letter from JPO, Jan. 11, 2006.

* cited by examiner

SYSTEMS AND METHODS FOR IDENTITY-BASED ENCRYPTION AND RELATED CRYPTOGRAPHIC TECHNIQUES

CROSS-REFERENCE TO RELATED APPLICATIONS

This application claims the benefit of U.S. provisional application No. 60/311,946, filed Aug. 13, 2001, which is incorporated herein by reference.

STATEMENT REGARDING FEDERALLY SPONSORED RESEARCH OR DEVELOPMENT

The present invention was made with the support of DARPA contract F30602-99-1-0530. The U.S. Government has certain rights in the invention.

REFERENCE TO COMPACT DISK APPENDIX

Not applicable.

BACKGROUND OF THE INVENTION

The field of the present invention relates generally to cryptographic systems.

Public-key cryptographic systems allow two people to exchange private and authenticated messages without requiring that they first have a secure communication channel for sharing private keys. One of the most widely used public-key cryptosystem is the RSA cryptosystem disclosed in U.S. Pat. No. 4,405,829. The RSA cryptosystem is currently deployed in many commercial systems. It is used by web servers and browsers to secure web traffic, it is used to ensure privacy and authenticity of e-mail, it is used to secure remote login sessions, and it is at the heart of electronic credit-card payment systems. In short, RSA is frequently used in applications where security of digital data is a concern.

According to public-key cryptosystems such as the RSA cryptosystem, each person has a unique pair of keys: a private key that is a secret and a public key that is widely known. This pair of keys has two important properties: (1) the private key cannot be deduced from knowledge of the public key alone, and (2) the two keys are complementary, i.e., a message encrypted with one key of the pair can be decrypted only with the complementary key. In these systems, both the public key and the private key in a pair are generated together as the output of a key generation algorithm that takes as input a random seed. Consequently, in these cryptosystems, people cannot choose a desired public or private key, but must simply use the keys that are generated for them by a key generation algorithm. This has the disadvantage that others cannot encrypt messages to a person until that person generates and publishes a public key. Another problem with this type of cryptosystem is that an impostor can publish a public key and claim that it belongs to someone else. To address this issue, a trusted certificate authority (CA) is used to authenticate individuals and certify to others that the individual's public key is authentic. Unfortunately, this adds complexity to the cryptosystem since a sender must obtain a certificate for every receiver, and must obtain a new certificate every time an existing certificate expires. It also requires receivers to create public keys, publish them, register certificates with the CA, and renew such certificates when they expire.

In 1984 Shamir envisioned a new type of public key encryption scheme (described in A. Shamir, "Identity-based cryptosystems and signature schemes", in *Advances in Cryptology—Crypto '84*, Lecture Notes in Computer Science, Vol. 196, Springer-Verlag, pp. 47–53, 1984). According to Shamir's scheme, a person's public key consists of a public identifier, which may be the person's name and network address, or combination of name and e-mail address, social security number, street address, telephone number, or office address. Because the public key is the person's pre-existing public identifier (ID) rather than a key produced from a random seed, this kind of public key cryptosystem is called an identity-based encryption (IBE) scheme. Shamir, however, did not provide a concrete, practical IBE cryptosystem. In fact, Shamir argued that existing cryposystems (such as RSA) could not be adapted to realize a secure IBE cryptosystem.

In the years since Shamir proposed his IBE scheme there have been several attempts to realize an identity-based cryptosystem. Some proposals require that users not collude. Other proposals require the private key generator (PKG) to spend an impractically long time for each private key generation request. Some proposals require tamper resistant hardware.

In short, there remains a need for improved cryptographic methods and systems.

SUMMARY OF THE INVENTION

According to one embodiment of the invention, a method of encrypting a first piece of information to be sent by a sender to a receiver uses an encryption key generated from a second piece of information. A bilinear map and the encryption key are used to encrypt at least a portion of the first piece of information to be sent from the sender to the receiver. The bilinear map may be symmetric or asymmetric. The bilinear map may be based on a Weil pairing or a Tate pairing defined on an algebraic group derived from an elliptic curve. More generally, the bilinear map may be based on a pairing defined on algebraic varieties.

According to one embodiment of the invention, encrypting the portion of the first piece of information can be completed prior to generating a decryption key corresponding to the encryption key.

According to another embodiment of the invention, the second piece of information is known to the receiver prior to the generation of a decryption key corresponding to the encryption key. The second piece of information may comprise a character string such as an e-mail address, name or other identifier associated with the receiver, according to different embodiments of the invention. The second piece of information may also include, according to various embodiments, an attribute associated with the receiver or information corresponding to a time or times, such as a date or series of dates defining one or more time intervals. A decryption key may be provided based on a time that a request for the decryption key is received relative to the information corresponding to a time. According to other embodiments of the invention, the second piece of information may include a message identifier, a credential identifier or a message subject identifier.

According to another embodiment of the invention, a message key is generated from the encryption key using a bilinear map, and a cryptographic hash function is applied to the message key.

According to another embodiment of the invention, encrypting the portion of the first piece of information includes generating a mask from the second piece of information using a bilinear map. The mask is applied to the portion of the second piece of information.

An embodiment of the invention is directed to a method of decrypting ciphertext which has been encrypted by a sender using an identity-based encryption key associated with a receiver. A decryption key derived from the encryption key is obtained. At least a portion of the ciphertext is decrypted using a bilinear map and the decryption key. The bilinear map may be symmetric or asymmetric. The bilinear map may be based on a Weil pairing or a Tate pairing defined on an algebraic group derived from an elliptic curve.

According to another embodiment of the invention, the ciphertext is obtained prior to creating the decryption key. According to another embodiment of the invention, the first piece of information is known to the receiver prior to obtaining the ciphertext and prior to obtaining the decryption key. The decryption key may be obtained by sending a request to a private key generator, including information sent together with the ciphertext.

An embodiment of the invention is directed to a method of generating a decryption key corresponding to an encryption key. An algebraic group, a group action, and a master key are provided. The encryption key is generated based on a first piece of information. The decryption key is generated based on the group action, the master key and the encryption key. According to one embodiment of the invention, the group action is capable of being calculated in polynomial time. According to another aspect of the invention, generation of the decryption key in the absence of the master key would require greater than polynomial time.

Another embodiment of the invention is directed to a method of providing system parameters for a cryptographic system. Algebraic groups $G_1$ and $G_2$ having an order q are provided, together with associated group actions. In addition, a bilinear map is provided that maps pairs of points in $G_1$ to points in $G_2$. In another embodiment, a system parameter representing a member P of $G_1$, and a system parameter representing a member $P_{pub}$ of $G_1$ are provided, where $P_{pub}$ is based on the group action of a master key s applied to P. According to other embodiments of the invention, a system parameter representing a set of one or more hash functions $H_1$, $H_2$, $H_3$, or $H_4$ are provided. According to another embodiment of the invention, a system parameter representing a size n of a message space is provided.

According to another embodiment of the invention, the bilinear map may be asymmetric or symmetric. In another embodiment the bilinear map is based on a Weil pairing or a Tate pairing defined on a portion of an elliptic curve.

According to another embodiment of the invention, the algebraic group $G_1$ is defined by an elliptic curve defined over a field of order p and the order q is less than the order p. According to another aspect of the invention, the length of p is at least 1024 bits and the length of q is no greater than 160 bits.

Another embodiment of the invention is directed to a method for managing cryptographic communication including generating shares of a master key. The shares are stored in separate systems. A request from a receiver to obtain a private key is responded to in the separate systems by generating from the respective shares of the master key, corresponding respective shares of the private key. The receiver constructs the private key from the shares of the private key, where the private key corresponds to identifying information of the receiver.

Another embodiment of the invention is directed to a method for communicating between a sender and a receiver.

A message to be sent from the sender to the receiver is encrypted, and the message is sent from the sender to the receiver. A request for a decryption key is received from the receiver of the message. After receiving the request for the decryption key, information indicating that the receiver has received the message is generated, and the decryption key is provided to the receiver. According to an embodiment of the invention, a return address of the sender is included in the message, and an acknowledgment that the message has been received is sent to the return address. According to another aspect of the invention, an identification of the message is included in an acknowledgment and the acknowledgment is sent to the sender. According to another aspect of the invention, the encryption key is derived based on a return address of the sender.

Another embodiment of the invention is directed to a method for communicating between a sender and a receiver having a credential. Identifying information of the receiver is obtained. A credential required for the receiver to gain a decryption key is specified, and an encryption key is derived from the identifying information of the receiver and the credential. A message to be sent from the sender to the receiver is encrypted using the encryption key and a bilinear map, and the message is sent from the sender to the receiver. A request for a decryption key is received from the receiver of the message. It is determined whether the receiver has the credential, and if the receiver has the credential, the decryption key is provided to the receiver. The receiver then may use the decryption key and the bilinear map to decrypt the message.

Another embodiment of the invention is directed to a method of communicating between a sender and a receiver involving storing a decryption key on a target system. Sets of decryption keys associated with times messages may be decrypted are derived, and the decryption keys are stored on the target system. An encryption key is derived from a string associated with a time a message is to be decrypted. A message is encrypted using the encryption key. The message is received on the target system, and the message is decrypted using a bilinear map and the corresponding decryption key.

Another embodiment of the invention is directed to a method of communicating between a sender and receiver involving entities having different responsibilities. A set of decryption keys is derived from a master key and a set of strings associated with different responsibilities. The decryption keys are provided to entities having the respective responsibilities. An encryption key is derived from a string associated with one of the different responsibilities. A message to be sent from the sender to the receiver is encrypted using the encryption key and a bilinear map. An entity having a particular responsibility receives the message and decrypts the message using the respective decryption key and the bilinear map. According to one embodiment of the invention, the string corresponding to the particular responsibility comprises a subject line of an e-mail.

BRIEF DESCRIPTION OF THE DRAWING FIGURES

DETAILED DESCRIPTION OF THE INVENTION

Figure 1:
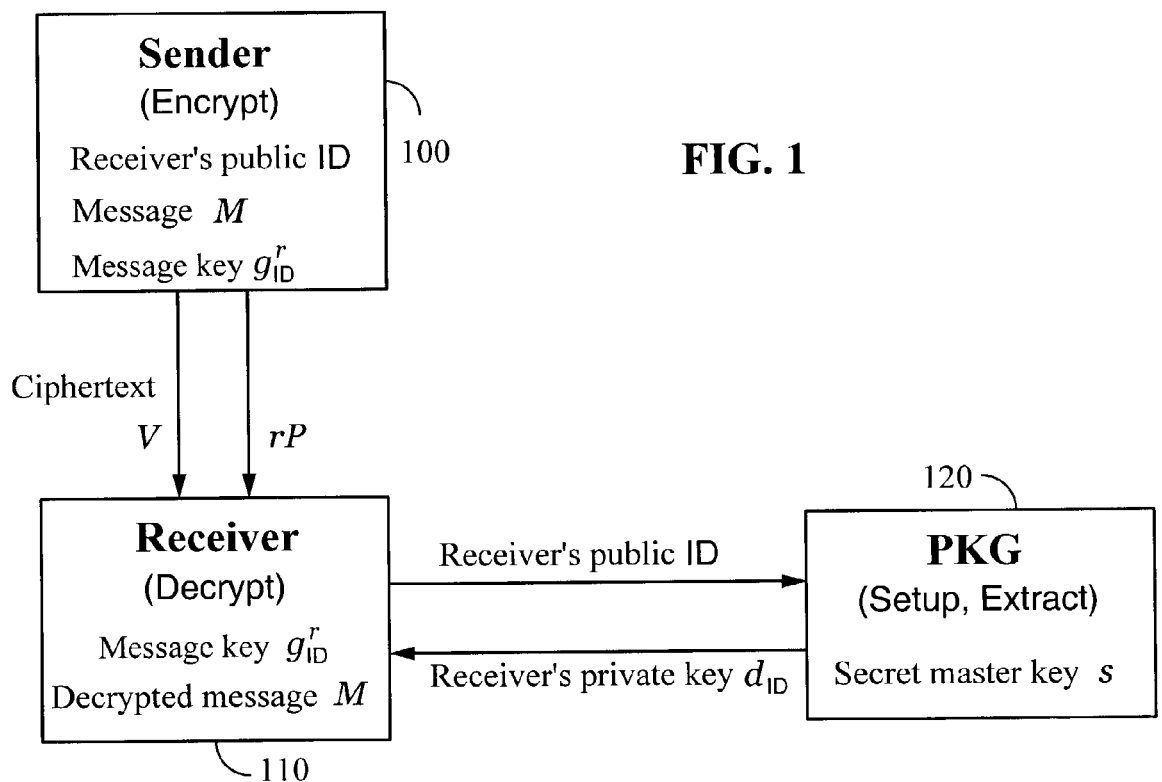
FIG. 1 is a block diagram illustrating a cryptosystem according to an embodiment of the invention, showing steps taken by a sender, a receiver, and a private key generator (PKG), and information communicated between them.

The following description provides details of several exemplary embodiments of the cryptographic techniques of the present invention, as well as a technical discussion of the security of the system.

Overview

As is normally the case with modern cryptosystems, the techniques of the present invention are generally implemented on computers connected by a communication medium. Although typically the computers are connected by the Internet or another computer network, any communication medium may be used.

One embodiment of the invention comprises an identity-based encryption system that uses a secret message key derived from identity-based information. The message key may be used by a sender to encrypt a message, and by a receiver to decrypt the message. The secret message key is computed by the sender from an identity-based public key of the receiver. The same message key may be computed by the receiver from the receiver's private key, which is derived from the receiver's identity-based public key. Both sender and receiver compute the same secret key using a bilinear map. For example, in one embodiment, an asymmetric or symmetric bilinear map $\hat{e}: \mathbb{G}_0 \times \mathbb{G}_1 \to \mathbb{G}_2$ is used where $\mathbb{G}_0, \mathbb{G}_1, \mathbb{G}_2$ are (not necessarily distinct) algebraic groups. In the case where $\mathbb{G}_0$ is equal to $\mathbb{G}_1$, we say the bilinear map is symmetric and often denote it as $\hat{e}: \mathbb{G}_1 \times \mathbb{G}_1 \to \mathbb{G}_2$. A bilinear map $\hat{e}$ that is non-degenerate and efficiently computable will be referred to as an admissible map. It is preferable in some embodiments of the invention that the bilinear map be admissible.

The convention throughout this description will be to denote the group operations of $\mathbb{G}_0$ and $\mathbb{G}_1$ by addition, and the group operation of $\mathbb{G}_2$ by multiplication. For a group $\mathbb{G}$ of prime order we use $\mathbb{G}^*$ to denote the set $\mathbb{G}^* = \mathbb{G} \setminus \{O\}$ where O is the identity element in the group $\mathbb{G}$. The set of binary strings of arbitrary length is denoted by $\{0, 1\}^*$. We use $\mathbb{G}_q$ to denote the group $\{0, \ldots, q-1\}$ under addition modulo q, and we use $\mathbb{G}^+$ to denote the set of positive integers. We note that there is a natural group action of $\mathbb{Z}_q$ on $\mathbb{G}$ given by repeated addition, and we denote the result of the action of an element $a \in \mathbb{Z}_q$ on an element $P \in \mathbb{G}$ by aP.

According to another embodiment of the invention, a certain variant (involving the map $\hat{e}$) of the computational Diffie-Hellman problem is hard. In one implementation the map $\hat{e}$ is admissible and the orders of $\mathbf{G}_0, \mathbb{G}_1, \mathbb{G}_2$ have a very large prime factor q. The orders of $\mathbb{G}_0, \mathbb{G}_1$ and $\mathbb{G}_2$ may be equal to each other. Without loss of generality, the following description assumes for simplicity that the orders of $\mathbb{G}_0, \mathbb{G}_1$ and $\mathbb{G}_2$ are all of prime order q.

In an exemplary embodiment, an admissible map $\hat{e}: \mathbb{G}_1 \times \mathbb{G}_1 \to \mathbb{G}_2$ is used to realize an identity-based cryptosystem, as follows. To encrypt a message, a sender uses a public key $Q_{ID} \in \mathbb{G}_1$ associated with a public identifier ID for the intended receiver. To decrypt the encrypted message, the receiver uses a complementary private key $d_{ID} \in \mathbb{G}_1$. The private key is computed from the public key $Q_{ID}$, a secret master key $s \in \mathbb{Z}_q^*$, and a group action of $\mathbb{Z}_q^*$ on $\mathbb{G}_1$. In one embodiment, for example, $d_{ID} = sQ_{ID}$. Since the secret master key s is known only by a trusted PKG, users normally cannot themselves compute private keys. To obtain a private key, an individual may obtain it from the PKG, preferably after being authenticated. At any time, however, anyone can compute the public key $Q_{ID}$ associated with any public identifier ID even before the corresponding private key has been determined. For example, in one embodiment the public key $Q_{ID}$ may be obtained by (1) using a conventional character encoding scheme to map the public identifier ID to a corresponding binary string in $\{0, 1\}^*$, and (2) using a hash function $H_1: \{0, 1\}^* \to \mathbb{G}_1^*$ to hash the binary string to the element $Q_{ID}$ of $\mathbb{G}_1^*$, where the order of $Q_{ID}$ is q.

In this embodiment, a message intended for a receiver with public identifier ID may be encrypted and decrypted as follows. The admissible map $\hat{e}$ may be used by the sender to determine a secret message key. Although the sender and receiver do not share all the same information, using the fact that the map $\hat{e}$ is bilinear, they can use different information to compute the same message key. Since each uses information that is private, the message key is a secret.

To illustrate how this approach may be implemented, suppose that the sender has knowledge of elements P and sP in $\mathbb{G}_1$. In one embodiment, for example, elements P and $P_{pub} = sP$ in $\mathbb{G}_1$ are published system parameters. Now further suppose the sender privately selects a random $r \in \mathbb{Z}_q^*$, and uses the receiver's identity-based public key $Q_{ID}$ to compute $g_{ID}^r = \hat{e}(rQ_{ID}, sP)$. The element $g_{ID}^r$ is an identity-based secret which the sender may use as a secret message key to perform identity-based encryption of a message to the receiver. The sender may then send an encrypted message together with rP to the receiver. The receiver then receives rP and uses it together with the private key $sQ_{ID}$ to compute the secret message key $g_{ID}^r = \hat{e}(sQ_{ID}, rP)$. This secret message key is equal to the secret message key computed by the sender because of the bilinearity of the $\hat{e}$ map. This computed element $g_{ID}{}^r \in \mathbb{G}_2$ is thus an identity-based secret of the sender which the receiver may compute using the element rP and the private key $sQ_{ID}$. This secret may be used as a message key for cryptographic communication between the sender and receiver.

Note that the PKG also knows the receiver's private key, so can also compute the secret message key and decrypt the message. The sender, receiver and PKG all have sufficient information to compute the secret message key. No other entity, however, normally has knowledge of the sender's secret r or the receiver's secret $sQ_{ID}$. The security of this embodiment is related to the difficulty of computing the secret message key, which is based upon a combination of r, s, and $Q_{ID}$ using a bilinear map, without knowledge of r or knowledge of $sQ_{ID}$.

In one embodiment, the message key $g_{ID}{}^r$ is used to determine a mask which is used to encrypt and decrypt the bits of the message using an XOR operation (denoted by '$\oplus$'). Specifically, the ciphertext V of a message M is produced by computing $V=M \oplus H_2(g_{ID}{}^r)$, where $H_2: \mathbb{G}_2 \to \{0, 1\}^n$ is a hash function, and n is the bit length of the message. Conversely, the message M is recovered from the ciphertext V by computing $M=V \oplus H_2(g_{ID}{}^r)$.

In another embodiment, the one-way encryption scheme outlined above is made more secure by converting it into a chosen ciphertext secure system. In one embodiment of the invention, for example, a general technique of Fujisaki-Okamoto is used.

In another embodiment, the master key is broken into components $s_i$ distributed among several private key generators in a distributed PKG. For a given user with a public key $Q_{ID}$ based on an identifier ID, each of these private key generators in the distributed PKG computes a private key portion $d_i$ using Q and its portion $s_i$ of the master key. These private key portions can be combined by the user and used as a single private key $d_{ID}$ to decrypt messages encrypted with $Q_{ID}$.

In another embodiment, an ElGamal encryption scheme is provided with built-in key escrow, i.e., where one global escrow key can decrypt ciphertexts encrypted under any public key. In this embodiment, the exemplary system described above is adapted as follows. Suppose that the receiver also has knowledge of elements P and sP. Rather than obtaining a private key from the PKG, the receiver generates a public/private key pair by selecting a random $x \in \mathbb{Z}_q^*$, computing xP using a group action, and publishing a public key based on the result of the computation. In one embodiment, the public key is xP and the complementary private key is d=x(sP). (Thus, xP plays the role of $Q_{ID}$, and $d=x(sP)=s(xP)$ plays the role of $d_{ID}=sQ_{ID}$.) To encrypt a message to the receiver, the sender as before selects a random r and sends rP to the receiver. Then the receiver knows the pair (rP, x(sP)), where x(sP)=d is a secret, while the sender knows the pair (sP, r(xP)), where r(xP) is a secret. Thus, the sender and receiver both can compute $g=\hat{e}(rP, x(sP))=\hat{e}(sP, r(xP))$, where the second equality follows from the bilinearity of $\hat{e}$. This secret, however, can also be determined from knowledge of the master key s. Using the element rP from the sender, the receiver's public key xP, and the master key s, the message key can be computed by evaluating $g=\hat{e}(rP, s(xP))$. It should be noted that this embodiment makes use of a symmetric bilinear map $\hat{e}: \mathbb{G}_1 \times \mathbb{G}_2 \to \mathbb{G}_2$.

In several embodiments of the invention, $\mathbb{G}_1$ is a subgroup of an elliptic curve, and an admissible map $\hat{e}$ is constructed from the Weil pairing (or Tate pairing) on the elliptic curve. (Recall that, by definition, a subgroup is not necessarily smaller than the group, i.e., $\mathbb{G}_1$ may be the entire elliptic curve). More generally, $\mathbb{G}_1$ may be an abelian variety and $\hat{e}$ an admissible pairing of its elements. In embodiments using a map $\hat{e}: \mathbb{G}_0 \times \mathbb{G}_1 \to \mathbb{G}_2$ where $\mathbb{G}_0$ and $\mathbb{G}_1$ are distinct, $\mathbb{G}_0$ also may be a subgroup of an elliptic curve, or more generally, an abelian variety.

In other embodiments, various novel applications of identity-based encryption are provided. New and useful applications of IBE systems are possible by using other types of public identifiers, or enhanced public identifiers. For example, the public identifier ID is not limited to an identifier associated with an individual person, but may be an identifier associated with any type of entity including not just individuals but also organizations, governmental agencies, corporations and the like. It should also be noted that individual identities forming a group may be naturally combined to produce a joint identity for the group with a corresponding group private key. The group's private key need not be issued by a PKG, but is simply the combination of the separate private keys of the entities composing the group. It should be noted that the basic ID specifying the identity of an entity is not limited to the name, e-mail address, address, or social security number of an entity, but could also include other types of information such as domain names, URLs, 9-digit zip codes, tax identification numbers, and so on. In many applications, the public identifier ID will contain some character string known to the public to be uniquely associated with a particular entity or collection of entities. In general, however, the public identifier ID can be any arbitrary character string or other arbitrary information.

Various useful applications of IBE make use of enhanced public identifiers. An enhanced identifier may comprise a type of identifier that contains information not necessarily limited to information specifying the identity of a particular entity. For example, an ID can contain a credential descriptor such as a license number, official title, or security clearance associated with an entity. An agency can then manage the credentials by providing private keys only to entities it certifies. In one exemplary embodiment, an ID can contain a property descriptor such as a serial number, vehicle identification number, patent number, or the like. An agency responsible for registering property owners and authenticating owners can manage property registration by providing private keys only to entities that it registers as true owners. More generally, an association between two or more things can be managed by including identifiers for them in an ID. The PKG then acts as the management authority for the associations between things.

Another type of enhanced ID is an identifier that includes a time, a time interval, or a set of time intervals. A private key for such an identifier can then be constructed to automatically expire at a certain time, to automatically activate only after a certain time, or to be valid only for one or more specified time intervals. This technique can be combined with the credential and ownership management to control the time of activation and/or expiration.

From the above examples, it is evident that an identity-based encryption systems according to the present invention are not limited to any particular type of identifier. Thus, the term 'identity-based' should be understood in general terms as indicating that any arbitrary character string or other arbitrary information may be used as a basis.

According to another embodiment, an IBE system allows the delegation of decryption capabilities. An entity can set up its own IBE system with its own secret master key, and assume the role of PKG for this IBE system. Because the entity has the master key, it can issue keys to delegate decryption capabilities to others. For example, if the entity is a corporation, the employees can obtain private keys from the corporate PKG. Individuals can be issued private keys matching their names, titles, duties, projects, cases, or any other task-related identifier. In another example, an individual can issue to a laptop private keys that are valid only for the duration of a business trip. If the laptop is lost or stolen, only the keys for that time period are compromised. The master key, which remained at home, is uncompromised.

It should also be pointed out that the medium of communication need not be limited to e-mail or the Internet, but could include any communication medium such as printed publications, digital storage media, radio broadcasting, wireless communications, and so on.

DEFINITIONS

Identity-Based Encryption. An exemplary embodiment of an identity-based encryption system and method $\epsilon$ uses four randomized algorithms: Setup, Extract, Encrypt, Decrypt:

Setup: Given a security parameter k, return params (system parameters) and master-key. The system parameters include a description of a finite message space $\mathcal{M}$, and a description of a finite ciphertext space C. Normally, the system parameters will be publicly known, while the master-key will be known only to a Private Key Generator (PKG).

Extract: takes as input params, master-key, and an arbitrary ID$\in\{0, 1\}$*, and returns a private key d. Here ID is an arbitrary string that will be used as a public key, and d is the corresponding private decryption key. The Extract algorithm extracts a private key from the given public key. Because the extraction requires the master-key, it is normally performed by the PKG.

Encrypt: takes as input params, ID, and M$\in\mathcal{M}$. It returns a ciphertext C$\in$C.

Decrypt: takes as input params, C$\in$C, and a private key d. It return M$\in\mathcal{M}$.

According to an embodiment of the invention, these algorithms satisfy the standard consistency constraint that ensures decryption will faithfully recover any encrypted message. More specifically, when d is the private key generated by algorithm Extract when it is given ID as the public key, then $\forall M \in \mathcal{M}$: Decrypt(params, C, d)=M where
C=Encrypt(params, ID, M).

In an identity-based cryptosystem according to an embodiment of the invention, the above algorithms are used together as illustrated in FIG. 1. A sender 100 uses Encrypt, a receiver 110 uses Decrypt, and a PKG 120 uses Setup and Extract. To send a message M to receiver 110, the sender 100 obtains an ID of the receiver (e.g., the receiver's e-mail address) and combines it with a randomly selected integer r to compute a secret message key $g_{ID}^r$. The element rP is sent to receiver 110 who combines it with a private key $d_{ID}$ to determine the same message key $g_{ID}^r$. Because the sender and receiver share the secret message key, a message encrypted with the key by the sender can be decrypted by the receiver. In particular, the sender encrypts M with the message key to produce ciphertext V which is communicated with rP to the receiver. The receiver then uses the secret message key to decrypt the ciphertext to recover the original message. In order to decrypt messages, however, the receiver 110 must first obtain the private key $d_{ID}$ from the PKG 120. After the PKG authenticates the identity of the receiver, it provides the receiver with the private key corresponding to the receiver's ID. (Note that, in this embodiment, the PKG can compute any private key in the system, and can thus decrypt any message to any user in the system.)

Chosen ciphertext security. Chosen ciphertext security (IND-CCA) is the standard acceptable notion of security for a public key encryption scheme. An embodiment of an identity-based encryption system and method may be implemented to satisfy this strong notion of security. Additionally, the selected level of chosen ciphertext security may be strengthened a bit. The reason is that when an adversary attacks a public key ID in an identity-based system, the adversary might already possess the private keys of users $ID_1, \ldots, ID_n$ of her choice. In an embodiment of the invention, the system remains secure under such an attack. That is, the system remains secure even when the adversary can obtain the private key associated with any identity $ID_i$ of her choice (other than the public key ID being attacked). We refer to such queries as private key extraction queries. The system of this embodiment also remains secure even though the adversary is challenged on a public key ID of her choice (as opposed to a random public key).

We say that an embodiment of an identity-based encryption system or method $\epsilon$ is semantically secure against an adaptive chosen ciphertext attack (IND-ID-CCA) if no polynomially bounded adversary $\mathcal{A}$ has a non-negligible advantage against the Challenger in the following IND-ID-CCA game:

Setup: The challenger takes a security parameter k and runs the Setup algorithm. It gives the adversary the resulting system parameters params. It keeps the master-key to itself.

Phase 1: The adversary issues queries $q_1, \ldots, q_m$ where query $q_i$ is one of:

Extraction query $<ID_i>$. The challenger responds by running algorithm Extract to generate the private key $d_i$ corresponding to the public key $<ID_i>$. It sends $d_i$ to the adversary.

Decryption query $<ID_i, C_i>$. The challenger responds by running algorithm Extract to generate the private key $d_i$ corresponding to $ID_i$. It then runs algorithm Decrypt to decrypt the ciphertext $C_i$ using the private key $d_i$. It sends the resulting plain-text to the adversary.

These queries may be asked adaptively, that is, each query $q_i$ may depend on the replies to $q_1, \ldots, q_{i-1}$.

Challenge: Once the adversary decides that Phase 1 is over it outputs two equal length plain-texts $M_0, M_1 \in \mathcal{M}$, and an identity ID on which it wishes to be challenged. The only constraint is that ID did not appear in any private key extraction query in Phase 1.

The challenger picks a random bit $b \in \{0, 1\}$ and sets C=Encrypt(params, ID, $M_b$). It sends C as the challenge to the adversary.

Phase 2: The adversary issues more queries $q_{m+1}, \ldots, q_n$ where query $q_i$ is one of:

Extraction query $<ID_i>$ where $ID_i \neq ID$. Challenger responds as in Phase 1.

Decryption query $<ID_i, C_i> \neq <ID, C>$. Challenger responds as in Phase 1.

These queries may be asked adaptively as in Phase 1.

Guess: Finally, the adversary outputs a guess $b' \in \{0, 1\}$. The adversary wins the game if b=b'.

We refer to such an adversary $\mathcal{A}$ as an IND-ID-CCA adversary. We define adversary $\mathcal{A}$'s advantage in attacking the scheme $\epsilon$ as the following function of the security parameter k (k is given as input to the challenger):

$$Adv_{\epsilon,A}(k) = \left| \Pr[b = b'] - \frac{1}{2} \right|.$$

The probability is over the random bits used by the challenger and the adversary.

Using the IND-ID-CCA game we can define chosen ciphertext security for IBE schemes. As usual, we say that a function g: $\mathbb{R} \to \mathbf{R}$ is negligible if g(k) is smaller than $1/f(k)$ for any polynomial $f$.

Definition 1 We say that an IBE system $\epsilon$ is semantically secure against an adaptive chosen ciphertext attack if for any polynomial time IND-ID-CCA adversary $\mathcal{A}$ the function $Adv_{\epsilon,A}(k)$ is negligible. As shorthand, we say that $\epsilon$ is IND-ID-CCA secure.

Note that the standard definition of chosen ciphertext security (IND-CCA) is the same as above except that there are no private key extraction queries and the adversary is challenged on a random public key (rather than a public key of her choice). Private key extraction queries are related to the definition of chosen ciphertext security in the multiuser settings. After all, our definition involves multiple public keys belonging to multiple users. A multiuser IND-CCA may be reducible to single user IND-CCA using a standard hybrid argument. This does not hold in the identity-based settings, IND-ID-CCA, since the adversary gets to choose which public keys to corrupt during the attack. To emphasize the importance of private key extraction queries we note that one implementation of the disclosed IBE system can be modified (by removing one of the hash functions) into a system which has chosen ciphertext security when private extraction queries are disallowed. However, the implementation is insecure when extraction queries are allowed.

Semantically secure identity based encryption. The proof of security for an implementation of our IBE system makes use of a weaker notion of security known as semantic security (also known as semantic security against a chosen plain-text attack). Semantic security is similar to chosen ciphertext security (IND-ID-CCA) except that the adversary is more limited; it cannot issue decryption queries while attacking the challenge public key. For a standard public key system (not an identity based system) semantic security is defined using the following game: (1) the adversary is given a random public key generated by the challenger, (2) the adversary outputs two equal length messages $M_0$ and $M_1$ and receives the encryption of $M_b$ from the challenger where b is chosen at random in $\{0, 1\}$, (3) the adversary outputs b' and wins the game if b=b'. The public key system is said to be semantically secure if no polynomial time adversary can win the game with a non-negligible advantage. As shorthand we say that a semantically secure public key system is IND-CPA secure. Semantic security captures our intuition that given a ciphertext the adversary learns nothing about the corresponding plain-text.

To define semantic security for identity based systems (denoted IND-ID-CPA) we strengthen the standard definition by allowing the adversary to issue chosen private key extraction queries. Similarly, the adversary is challenged on a public key ID of her choice. We define semantic security for identity based encryption schemes using an IND-ID-CPA game. The game is identical to the IND-ID-CCA game defined above except that the adversary cannot make any decryption queries. The adversary can only make private key extraction queries. We say that an identity-based encryption scheme $\epsilon$ is semantically secure (IND-ID-CPA) if no polynomially bounded adversary $\mathcal{A}$ has a non-negligible advantage against the Challenger in the following IND-ID-CPA game:

Setup: The challenger takes a security parameter k and runs the Setup algorithm. It gives the adversary the resulting system parameters params. It keeps the master-key to itself.

Phase 1: The adversary issues private key extraction queries $ID_1, \ldots, ID_m$. The challenger responds by running algorithm Extract to generate the private key $d_i$ corresponding to the public key $ID_i$. It sends $d_i$ to the adversary. These queries may be asked adaptively.

Challenge: Once the adversary decides that Phase 1 is over it outputs two equal length plain-texts $M_0, M_1 \in \mathcal{M}$, and a public key ID on which it wishes to be challenged. The only constraint is that ID did not appear in any private key extraction query in Phase 1. The challenger picks a random bit $b \in \{0, 1\}$ and sets C=Encrypt(params, ID, $M_b$). It sends C as the challenge to the adversary.

Phase 2: The adversary issues more extraction queries $ID_{m+1}, \ldots, ID_n$. The only constraint is that $ID_i \neq ID$. The challenger responds as in Phase 1.

Guess: Finally, the adversary outputs a guess $b' \in \{0, 1\}$. The adversary wins the game if b=b'.

We refer to such an adversary $\mathcal{A}$ as an IND-ID-CPA adversary. As we did above, the advantage of an IND-ID-CPA adversary $\mathcal{A}$ against the scheme $\epsilon$ is the following function of the security parameter k:

$$Adv_{\epsilon,A}(k) = \left| \Pr[b = b'] - \frac{1}{2} \right|.$$

The probability is over the random bits used by the challenger and the adversary.

Definition 2 We say that the IBE system $\epsilon$ is semantically secure if for any polynomial time IND-ID-CPA adversary $\mathcal{A}$ the function $Adv_{\epsilon,A}(k)$ is negligible. As shorthand, we say that $\epsilon$ is IND-ID-CPA secure.

One way identity-based encryption. One can define an even weaker notion of security called one-way encryption (OWE). Roughly speaking, a public key encryption scheme is a one-way encryption if given the encryption of a random plain-text the adversary cannot produce the plain-text in its entirety. One-way encryption is a weak notion of security since there is nothing preventing the adversary from, say, learning half the bits of the plain-text. Hence, one-way encryption schemes do not generally provide secure encryption. In the random oracle model one-way encryption schemes can be used for encrypting session-keys (the session-key is taken to be the hash of the plain-text). We note that one can extend the notion of one-way encryption to identity based systems by adding private key extraction queries to the definition. We do not give the full definition here since we use semantic security as the weakest notion of security.

BILINEAR MAPS AND THE BILINEAR DIFFIE-HELLMAN ASSUMPTION

One embodiment of the invention is directed to an IBE system that makes use of a map ê: $\mathbb{G}_1 \times \mathbb{G}_1 \to \mathbb{G}_2$ between groups $\mathbb{G}_1$ and $\mathbb{G}_2$ of order q for some large prime q. A map ê may be called an admissible map if it satisfies the following properties:

1. Bilinear: The map ê: $\mathbb{G}_1 \times \mathbb{G}_1 \rightarrow \mathbb{G}_2$ satisfies ê(aP, bQ)=ê(P, Q)$^{ab}$ for all (P, Q)$\in \mathbb{G}_1 \times \mathbb{G}_1$ and all a, b$\in \mathbb{Z}$.
2. Non-degenerate: The map does not send all pairs in $\mathbb{G}_1 \times \mathbb{G}_1$ to the identity in $\mathbb{G}_2$. Observe that since $\mathbb{G}_1$, $\mathbb{G}_1$, $\mathbb{G}_2$ are groups of prime order this implies that if $\mathbb{G}_1 = \mathbb{G}_1$ and P is a generator of $\mathbb{G}_1 = \mathbb{G}_1$ then ê(P, P) is a generator of $\mathbb{G}_2$.
3. Computable: There is an efficient algorithm to compute ê(P, Q) for any (P, Q)$\in \mathbb{G}_1 \times \mathbb{G}_1$.

Although many of the embodiments are described with reference to a map ê: $\mathbb{G}_1 \times \mathbb{G}_1 \rightarrow \mathbb{G}_2$, this is only a specific case of bilinear maps used in embodiments of the invention. More generally, maps ê: $\mathbb{G}_0 \times \mathbb{G}_1 \rightarrow \mathbb{G}_2$ may be used, where $\mathbb{G}_0$ and $\mathbb{G}_1$ may be distinct. For simplicity of description, however, the description of many of the embodiments focuses primarily on the case where $\mathbb{G}_1$ and $\mathbb{G}_1$ are the same, and both groups are then denoted $\mathbb{G}_1$. Below we present a detailed exemplary embodiment using groups $\mathbb{G}_1$, $\mathbb{G}_2$ and an admissible map between them. In this exemplary embodiment, the group $\mathbb{G}_1$ is a subgroup of the additive group of points of an elliptic curve $E/\mathbb{F}_p$, and the group $\mathbb{G}_2$ is a subgroup of the multiplicative group of a finite field $\mathbb{F}_{p^2}^*$. As we will see below in the detailed example of an IBE system, the Weil pairing (which is not itself an admissible map) can be used to construct an admissible map between these two groups.

The existence of the admissible map ê: $\mathbb{G}_1 \times \mathbb{G}_1 \rightarrow \mathbb{G}_2$ as above has two direct implications to these groups.

The MOV reduction: The discrete log problem in $\mathbb{G}_1$ is no harder than the discrete log problem in $\mathbb{G}_2$. To see this, let P, Q$\in \mathbb{G}_1$ be an instance of the discrete log problem in $\mathbb{G}_1$ where both P, Q have order q. We wish to find an $\alpha \in \mathbb{Z}_q$ such that Q=$\alpha$P. Let g=ê(P, P) and h=ê(Q, P). Then, by bilinearity of ê we know that h=$g^\alpha$. By non-degeneracy of ê both g, h have order q in $\mathbb{G}_2$. Hence, we reduced the discrete log problem in $\mathbb{G}_1$ to a discrete log problem in $\mathbb{G}_2$. It follows that for discrete log to be hard in $\mathbb{G}_1$ we must choose our security parameter so that discrete log is hard in $\mathbb{G}_2$.

Decision Diffie-Hellman is Easy: The Decision Diffie-Hellman problem (DDH) in $\mathbb{G}_1$ is the problem of distinguishing between the distributions <P, aP, bP, abP> and <P, aP, bP, cP> where a, b, c are random in $\mathbb{Z}_q$ and P is random in $\mathbb{G}_1$. To see that DDH in $\mathbb{G}_1$ is easy, observe that given P, aP, bP, cP$\in \mathbb{G}_1^*$ we have $c = ab \mod q \Leftrightarrow$ ê(P, cP)=ê(aP, bP).

The Computational Diffie-Hellman problem (CDH) in $\mathbb{G}_1$ can still be hard (CDH in $\mathbb{G}_1$ is to find abP given random <P, aP, bP>). Exemplary embodiments may use mappings ê: $\mathbb{G}_1 \times \mathbb{G}_1 \rightarrow \mathbb{G}_2$ where CDH in $\mathbb{G}_1$ is believed to be hard even though DDH in $\mathbb{G}_1$ is easy.

The Bilinear Diffie-Hellman Assumption (BDH)

Since the Decision Diffie-Hellman problem (DDH) in $\mathbb{G}_1$ is easy, embodiments of the invention do not use DDH to build cryptosystems in the group $\mathbb{G}_1$. Instead, the security in embodiments of our IBE system is based on a novel variant of the Computational Diffie-Hellman assumption called the Bilinear Diffie-Hellman Assumption (BDH).

Bilinear Diffie-Hellman Problem. Let $\mathbb{G}_1$, $\mathbb{G}_2$ be two groups of prime order q. Let ê: $\mathbb{G}_1 \times \mathbb{G}_1 \rightarrow \mathbb{G}_2$ be an admissible map and let P be a generator of $\mathbb{G}_1$. The BDH problem in <$\mathbb{G}_1$, $\mathbb{G}_2$, ê> is as follows: Given <P, aP, bP, cP> for some a, b, c$\in \mathbb{Z}_q^*$ compute W=ê(P, P)$^{abc} \in \mathbb{G}_2$. An algorithm $\mathcal{A}$ has advantage $\epsilon$ in solving BDH in <$\mathbb{G}_1$, $\mathbb{G}_2$, ê> if $Pr[\mathcal{A}(P, aP, bP, cP) = \hat{e}(P, P)^{abc}] \geq \epsilon$ where the probability is over the random choice of a, b, c in $\mathbb{Z}_q^*$, the random choice of P$\in \mathbb{G}_1^*$, and the random bits of $\mathcal{A}$.

BDH Parameter Generator. We say that a randomized algorithm $\mathcal{G}$ is a BDH parameter generator if (1) $\mathcal{G}$ takes a security parameter k$\in \mathbb{Z}^+$, (2) $\mathcal{G}$ runs in polynomial time in k, and (3) $\mathcal{G}$ outputs a prime number q, the description of two groups $\mathbb{G}_1$, $\mathbb{G}_2$ of order q, and the description of an admissible map ê: $\mathbb{G}_1 \times \mathbb{G}_1 \rightarrow \mathbb{G}_2$. We denote the output of $\mathcal{G}$ by $\mathcal{G}(1^k)$=<q, $\mathbb{G}_1$, $\mathbb{G}_2$, ê>. The security parameter k is used to determine the size of q; for example, one could take q to be a random k-bit prime. For l =1, 2 we assume that the description of the group $\mathbb{G}_l$ contains polynomial time (in k) algorithms for computing the group action in $\mathbb{G}_l$ and contains a generator of $\mathbb{G}_l$. The generator of $\mathbb{G}_l$ enables us to generate uniformly random elements in $\mathbb{G}_l$. Similarly, we assume that the description of ê contains a polynomial time algorithm for computing ê. We give an example of a BDH parameter generator below in the detailed example of an IBE system using the Weil pairing.

Bilinear Diffie-Hellman Assumption. Let $\mathcal{G}$ be a BDH parameter generator. We say that an algorithm $\mathcal{A}$ has advantage $\epsilon(k)$ in solving the BDH problem for $\mathcal{G}$ if for sufficiently large k:

$$Adv_{\mathcal{G},\mathcal{A}}(k) = Pr\left[\mathcal{A}(q, G_1, G_2, \hat{e}, P, aP, bP, cP) = \hat{e}(P,P)^{abc} \middle| \begin{array}{l} \langle q, G_1, G_2, \hat{e}\rangle \leftarrow \mathcal{G}(1^k), \\ P \leftarrow G_1^*, a, b, c \leftarrow Z_q^* \end{array}\right] > \epsilon(k)$$

We say that $\mathcal{G}$ satisfies the BDH assumption if for any randomized polynomial time (in k) algorithm $\mathcal{A}$ and for any polynomial $f \in \mathbb{Z}[x]$ algorithm $\mathcal{A}$ solves the BDH problem with advantage at most $1/f(k)$. When $\mathcal{G}$ satisfies the BDH assumption we say that BDH is hard in groups generated by $\mathcal{G}$.

In the description below of a detailed example of an IBE system we give some examples of BDH parameter generators that are believed to satisfy the BDH assumption.

Hardness of BDH. It is interesting to study the relationship of the BDH problem to other hard problems used in cryptography. Currently, all we can say is that the BDH problem in <$\mathbb{G}_1$, $\mathbb{G}_2$, ê> is no harder than the CDH problem in $\mathbb{G}_1$ or $\mathbb{G}_2$. In other words, an algorithm for CDH in $\mathbb{G}_1$ or $\mathbb{G}_2$ is sufficient for solving BDH in <$\mathbb{G}_1$, $\mathbb{G}_2$, ê>. The converse is currently an open problem: is an algorithm for BDH sufficient for solving CDH in $\mathbb{G}_1$ or in $\mathbb{G}_2$?

We note that in a detailed example of an IBE system below, the isomorphisms from $\mathbb{G}_1$ to $\mathbb{G}_2$ induced by the admissible map are believed to be one-way functions. More specifically, for a point Q$\in \mathbb{G}_1^*$ define the isomorphism $f_Q$: $\mathbb{G}_1 \rightarrow \mathbb{G}_2$ by $f_Q(P)$=ê(P, Q). If any one of these isomorphisms turns out to be invertible, then BDH is easy in <$\mathbb{G}_1$, $\mathbb{G}_2$, ê>. Fortunately, an efficient algorithm for inverting $f_Q$ would imply an efficient algorithm for deciding DDH in the group $\mathbb{G}_2$. In the exemplary embodiments DDH is believed to be hard in the group $\mathbb{G}_2$. Hence, the isomorphisms $f_Q$: $\mathbb{G}_1 \rightarrow \mathbb{G}_2$ induced by the admissible map are believed to be one-way functions.

EXEMPLARY IDENTITY-BASED ENCRYPTION SCHEME

We describe the following exemplary embodiments in stages. First we describe a basic identity-based encryption system and method which is not secure against an adaptive chosen ciphertext attack. Another embodiment described below extends the basic scheme to get security against an adaptive chosen ciphertext attack (IND-ID-CCA) in the random oracle model. We later relax some of the requirements on the hash functions to provide alternative embodiments. These embodiments are described with reference to a generic BDH parameter generator $\mathcal{G}$ satisfying the BDH assumption. Later we describe a detailed example of an IBE system using the Weil pairing.

BasicIdent

The following describes a basic embodiment, called BasicIdent. We present the embodiment by describing the four algorithms: Setup, Extract, Encrypt, Decrypt. We let k be the security parameter given to the setup algorithm. We let $\mathcal{G}$ be some BDH parameter generator.

Setup: Given a security parameter $k \in \mathbb{Z}^+$, the algorithm in the basic embodiment works as follows:

Step 1: Run $\mathcal{G}$ on input k to generate a prime q, two groups $\mathbb{G}_1$, $\mathbb{G}_2$ of order q, and an admissible map ê: $\mathbb{G}_1 \times \mathbb{G}_1 \to \mathbb{G}_2$. Choose an arbitrary generator $P \in \mathbb{G}_1$.

Step 2: Pick a random $s \in \mathbb{Z}_q^*$ and set $P_{pub} = sP$.

Step 3: Choose a cryptographic hash function $H_1$: $\{0, 1\}^* \to \mathbb{G}_1^*$. Choose a cryptographic hash function $H_2$: $\mathbb{G}_2 \to \{0, 1\}^n$ for some n. The security analysis will view $H_1$, $H_2$ as random oracles.

The message space is $\mathcal{M} = \{0, 1\}^n$. The ciphertext space is $\mathcal{C} = \mathbb{G}_1^* \times \{0, 1\}^n$. The system parameters are params=<q, $\mathbb{G}_1$, $\mathbb{G}_2$, ê, n, P, $P_{pub}$, $H_1$, $H_2$>. The master-key is $s \in \mathbb{Z}_q^*$. Embodiments of the IBE system may be used to encrypt a symmetric key, in which case one may take n to be, for example, 128 or 256. For k one may use, for example, 512 or 1024 or 2048.

Extract: For a given string $ID \in \{0, 1\}^*$ the algorithm in the basic embodiment does: (1) computes $Q_{ID} = H_1(ID) \in \mathbb{G}_1^*$, and (2) sets the private key $d_{ID}$ to be $d_{ID} = sQ_{ID}$ where s is the master key.

Figure 2:
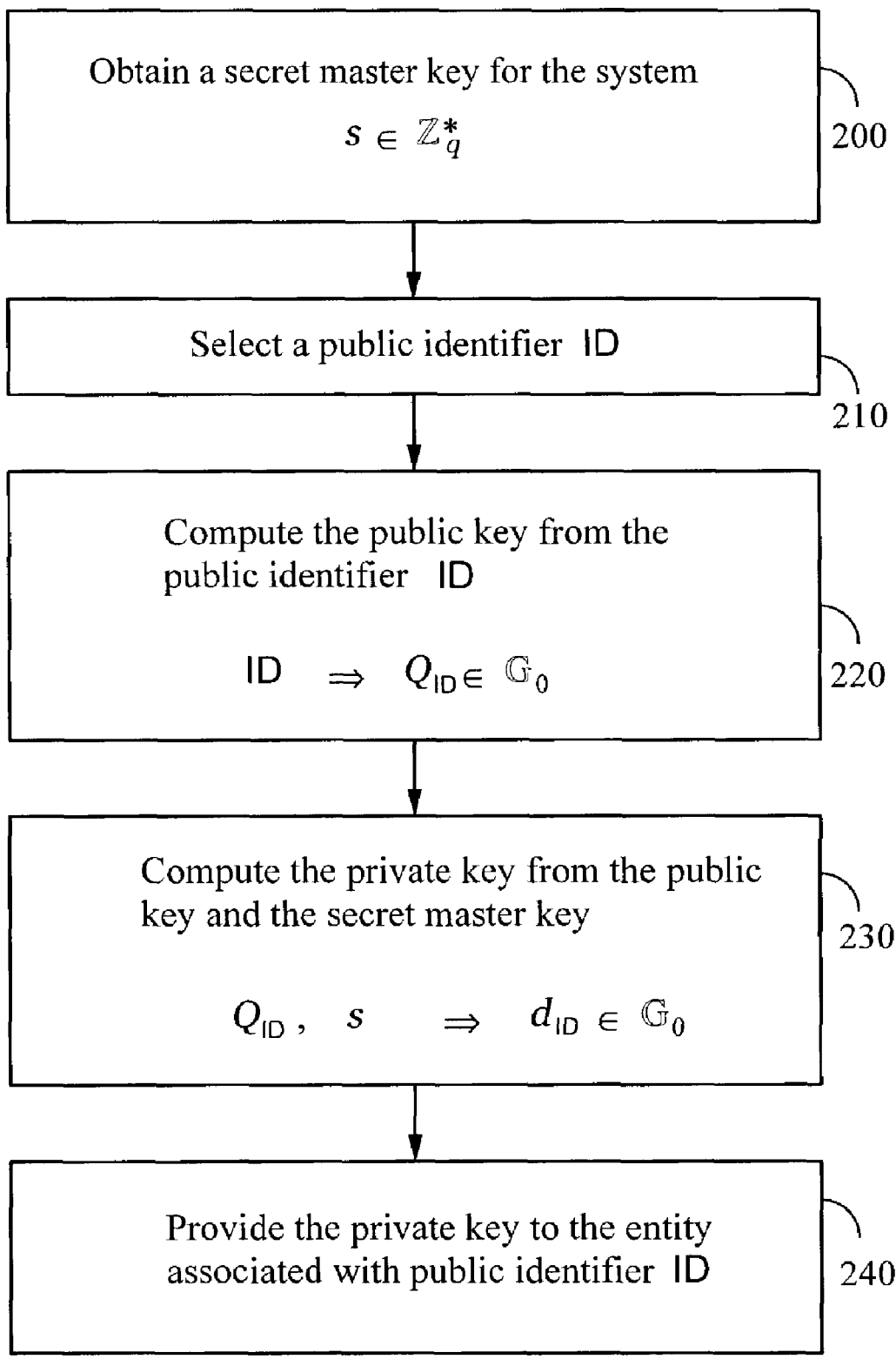
FIG. 2 is a block diagram illustrating steps performed by a PKG when generating a private key according to an embodiment of the invention.

Extract may be performed by a PKG in various embodiments as illustrated in FIG. 2. The PKG obtains the master key in block 200, obtains the public identifier ID in block 210, computes the public key from the ID in block 220, then computes the private key from the master key and the public key in block 230. In block 240 the private key is then sent to an entity associated with the public identifier ID, normally after the entity's identity has been authenticated.

Encrypt: To encrypt $M \in \mathcal{M}$, under the public key ID do the following: (1) compute $Q_{ID} = H_1(ID) \in \mathbb{G}_1^*$, (2) choose a random $r \in \mathbb{Z}_q^*$, and (3) set the ciphertext to be $$C = <rP, M \oplus H_2(g_{ID}^r)> \text{ where } g_{ID} = \hat{e}(Q_{ID}, P_{pub}) \in \mathbb{G}_2^*.$$

Figure 3:
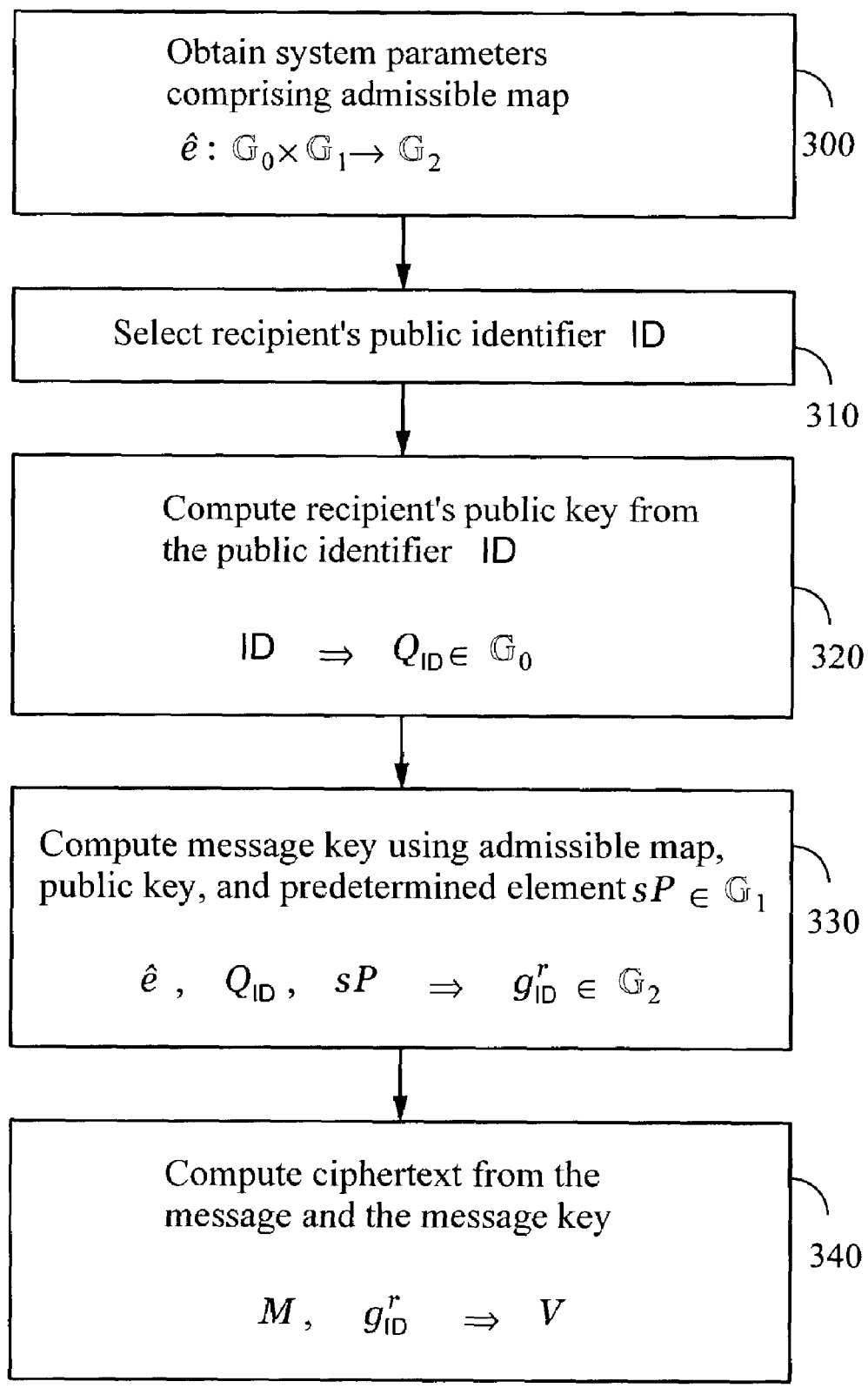
FIG. 3 is a block diagram illustrating steps performed by a sender when computing a secret message key and using it to encrypt a message intended for a receiver according to an embodiment of the invention.

In the basic embodiment, the sender of a message may perform Encrypt as illustrated in FIG. 3. In block 300 the system parameters are obtained (from an external resource such as a PKG, or from a local storage medium if they were obtained previously). A receiver's ID is determined in block 310, and the corresponding public key is computed from the ID in block 320. Then the secret message key is computed in block 330, and the message key is used to encrypt the message in block 340.

Decrypt: Let $C = <U, V> \in \mathcal{C}$ be a ciphertext encrypted using the public key ID. To decrypt C using the private key $d_{ID} \in \mathbb{G}_1^*$ compute:

$$V \oplus H_2(\hat{e}(d_{ID}, U)) = M.$$

Figure 4:
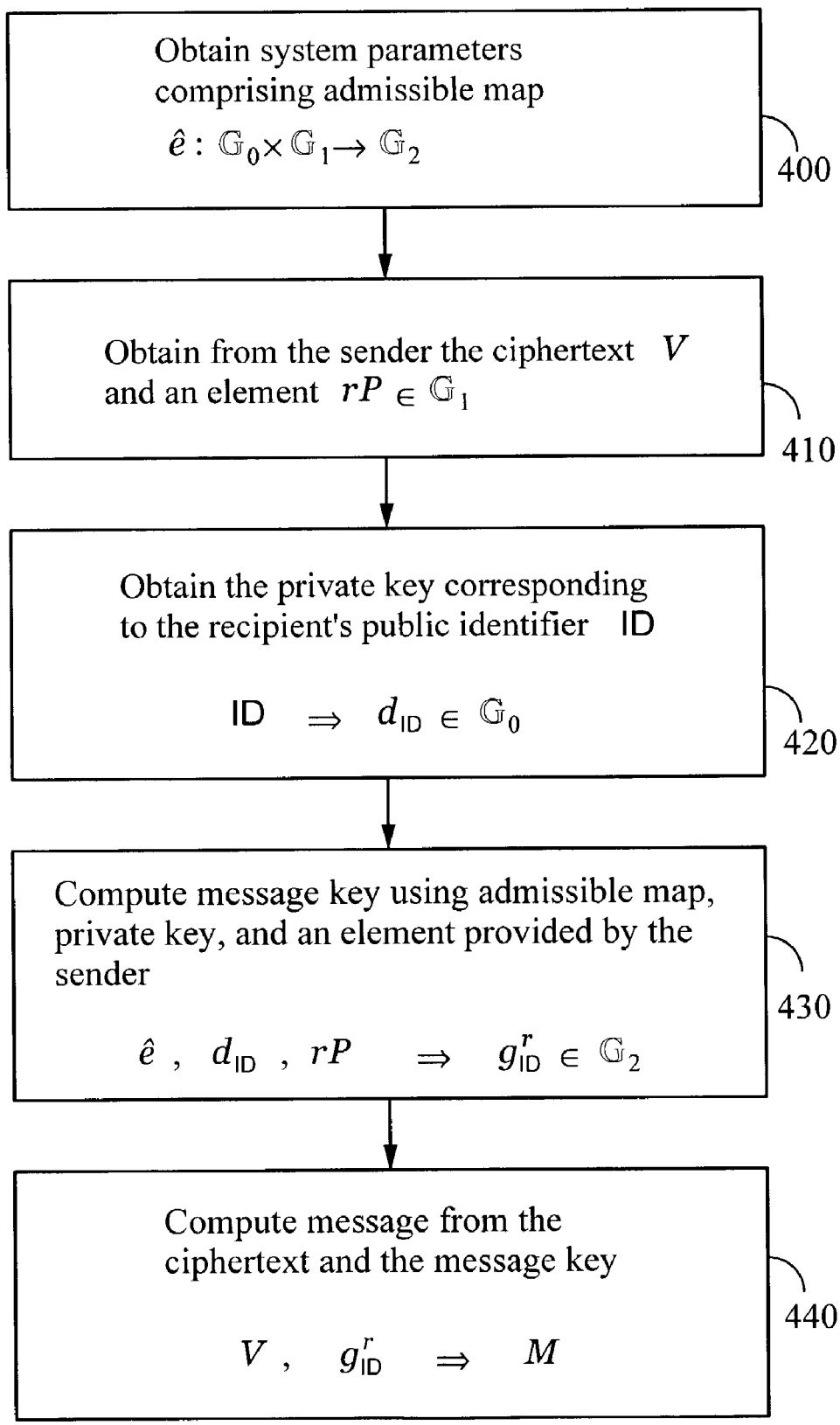
FIG. 4 is a block diagram illustrating steps performed by a receiver when computing a secret message key and using it to decrypt ciphertext received from a sender according to an embodiment of the invention.

In the basic embodiment, the receiver may perform Decrypt as illustrated in FIG. 4. In block 400, the system parameters are obtained (from an external resource such as a PKG, or from a local storage medium if they were obtained previously). The ciphertext V and an element rP are obtained from the sender in block 410. The element rP may be considered a portion of the total ciphertext obtained from the sender. In block 420 the receiver obtains the private key $d_{ID}$ corresponding to the public identifier ID used to encrypt the message. The private key is normally obtained from an external resource such as a PKG, or from a local storage medium if it was obtained previously. The secret message key is then computed in block 430, and used to decrypt the message in block 440.

This completes the description of BasicIdent for the basic embodiment. We first verify consistency. When everything is computed as above we have:

1. During encryption M is bitwise exclusive-ored with the hash of: $g_{ID}^r$.
2. During decryption V is bitwise exclusive-ored with the hash of: $\hat{e}(d_{ID}, U)$.

These masks used during encryption and decryption are the same since:

$$\hat{e}(d_{ID}, U) = \hat{e}(sQ_{ID}, rP) = \hat{e}(Q_{ID}, P)^{sr} = \hat{e}(Q_{ID}, P_{pub})^r = g_{ID}^r$$

Thus, applying decryption after encryption produces the original message M as required. Performance considerations of BasicIdent are discussed later.

Security. Next, we study the security of this basic embodiment.

The security of the exemplary system is based on the assumption that a variant of the Computational Diffie-Hellman problem in $\mathbb{G}_1$ is hard. The technical security details of the encryption scheme are discussed by the inventors in D. Boneh, M. Franklin, "Identity based encryption from the Weil pairing", extended abstract in *Advances in Cryptology—Crypto* 2001, Lecture Notes in Computer Science, Vol. 2139, Springer-Verlag, pp. 231–229, 2001, which is incorporated herein by reference.

In an exemplary embodiment, the performance of the system is comparable to the performance of ElGamal encryption in $\mathbb{F}_p^*$. The security of the exemplary system is based on a variant of the computational Diffie-Hellman assumption. Based on this assumption we show that the exemplary system has chosen ciphertext security in the random oracle model. In accordance with a distributed PKG embodiment, threshold cryptography techniques allow the PKG to be distributed so that the master-key is never available in a single location. Unlike common threshold systems, we show that robustness for the distributed PKG embodiment is free.

To argue about the security of the exemplary system, we define chosen ciphertext security for identity-based encryption. Our model gives the adversary more power than the standard model for chosen ciphertext security. First, we allow the attacker to attack an arbitrary public key ID of her choice. Second, while mounting a chosen ciphertext attack on ID we allow the attacker to obtain from the PKG the private key for any public key of her choice, other than the private key for ID. This models an attacker who obtains a number of private keys corresponding to some identities of her choice and then tries to attack some other public key ID of her choice. Even with the help of such queries, it is desirable that the attacker still have negligible advantage in defeating the semantic security of the system.

The following theorem shows that BasicIdent is a semantically secure identity based encryption scheme (IND-ID-CPA) assuming BDH is hard in groups generated by $\mathcal{G}$.

Theorem 1 Suppose the hash functions $H_1$, $H_2$ are random oracles. Then BasicIdent is a semantically secure identity based encryption scheme (IND-ID-CPA) assuming BDH is hard in groups generated by $\mathcal{G}$. Concretely, suppose there is an IND-ID-CPA adversary $\mathcal{A}$ that has advantage $\epsilon(k)$ against the scheme BasicIdent. Suppose $\mathcal{A}$ makes at most $q_E>0$ private key extraction queries and $q_{H_2}>0$ hash queries to $H_2$. Then there is an algorithm $\mathcal{B}$ that solves BDH in groups generated by $\mathcal{G}$ with advantage at least:

$$Adv_{G,B}(k) \geq \frac{2\epsilon(k)}{e(1+q_E) \cdot q_{H_2}}$$

Here $e \approx 2.71$ is the base of the natural logarithm. The running time of $\mathcal{B}$ is O(time($\mathcal{A}$)).

To prove the theorem we first define a related Public Key Encryption scheme (not an identity based scheme), called BasicPub. BasicPub is described by three algorithms: keygen, encrypt, decrypt.

keygen: Given a security parameter $k \in \mathbb{Z}^+$, the algorithm works as follows:
  Step 1: Run $\mathcal{G}$ on input k to generate two prime order groups $\mathbb{G}_1$, $\mathbb{G}_2$ and an admissible map $\hat{e}$: $\mathbb{G}_1 \times \mathbb{G}_1 \rightarrow \mathbb{G}_2$. Let q be the order of $\mathbb{G}_1$, $\mathbb{G}_2$. Choose an arbitrary generator $P \in \mathbb{G}_1$.
  Step 2: Pick a random $s \in \mathbb{Z}_q^*$ and set $P_{pub}=sP$. Pick a random $Q_{ID} \in \mathbb{G}_1^*$.
  Step 3: Choose a cryptographic hash function $H_2$: $\mathbb{G}_2 \rightarrow \{0, 1\}^n$ for some n.
  Step 4: The public key is $<q, \mathbb{G}_1, \mathbb{G}_2, \hat{e}, n, P, P_{pub}, Q_{ID}, H_2>$. The private key is $d_{ID}=sQ_{ID} \in \mathbb{G}_1^*$.

encrypt: To encrypt $M \in \{0, 1\}^n$ choose a random $r \in \mathbb{Z}_q^*$ and set the ciphertext to be:

$C=<rP, M \oplus H_2(g^r)>$ where $g=\hat{e}(Q_{ID}, P_{pub}) \in \mathbb{G}_2^*$ decrypt: Let $C=<U, V>$ be a ciphertext created using the public key $<q, \mathbb{G}_1, \mathbb{G}_2, \hat{e}, n, P, P_{pub}, Q_{ID}, H_2>$.
To decrypt C using the private key $d_{ID} \in \mathbb{G}_1^*$ compute:

$V \oplus H_2(\hat{e}(d_{ID}, U))=M$

This completes the description of BasicPub. We now prove Theorem 1 in two steps. We first show that an IND-ID-CPA attack on BasicIdent can be converted to a IND-CPA attack on BasicPub. This step shows that private key extraction queries do not help the adversary. We then show that BasicPub is IND-CPA secure if the BDH assumption holds. The proofs are omitted.

Lemma 2 Let $H_1$ be a random oracle from $\{0, 1\}^*$ to $\mathbb{G}_1^*$. Let $\mathcal{A}$ be an IND-ID-CPA adversary that has advantage $\epsilon(k)$ against BasicIdent. Suppose $\mathcal{A}$ makes at most $q_E>0$ private key extraction queries. Then there is a IND-CPA adversary $\mathcal{B}$ that has advantage at least $\epsilon(k)/e(1+q_E)$ against BasicPub. Its running time is O(time($\mathcal{A}$)).

Lemma 3 Let $H_2$ be a random oracle from $\mathbb{G}_2$ to $\{0, 1\}^n$. Let $\mathcal{A}$ be an IND-CPA adversary that has advantage $\epsilon(k)$ against BasicPub. Suppose $\mathcal{A}$ makes a total of $q_{H_2}>0$ queries to $H_2$. Then there is an algorithm $\mathcal{B}$ that solves the BDH problem for $\mathcal{G}$ with advantage at least $2\epsilon(k)/q_{H_2}$ and a running time O(time($\mathcal{A}$)).

Proof of Theorem 1. The theorem follows directly from Lemma 2 and Lemma 3. Composing both reductions shows that an IND-ID-CPA adversary on BasicIdent with advantage $\epsilon(k)$ gives a BDH algorithm for $\mathcal{G}$ with advantage at least $2\epsilon(k)/e(1+q_E)q_{H_2}$, as required. □

Identity-Based Encryption with Chosen Ciphertext Security

According to one embodiment of the invention, a technique of Fujisaki and Okamoto (described in E. Fujisaki and T. Okamoto, "Secure integration of asymmetric and symmetric encryption schemes", in *Advances in Cryptology—Crypto '99*, Lecture Notes in Computer Science, Vol. 1666, Springer-Verlag, pp. 537–554, 1999, which is incorporated herein by reference) may be appropriately adapted to convert the BasicIdent embodiment of the previous section into a chosen ciphertext secure embodiment of an IBE system (in the sense defined earlier) in the random oracle model. Let $\mathcal{M}$ be a probabilistic public key encryption scheme. We denote by $\epsilon_{pk}(M; r)$ the encryption of M using the random bits r under the public key pk. Fujisaki-Okamoto define the hybrid scheme $\epsilon^{hy}$ as:

$\epsilon_{pk}^{hy}(M)=<\epsilon_{pk}(\sigma; H_3(\sigma, M)), H_4(\sigma) \oplus M>$ Here $\sigma$ is generated at random and $H_3$, $H_4$ are cryptographic hash functions. Fujisaki-Okamoto show that if $\epsilon$ is a one-way encryption scheme then $\epsilon^{hy}$ is a chosen ciphertext secure system (IND-CCA) in the random oracle model (assuming $\epsilon_{pk}$ satisfies some natural constraints). We note that semantic security implies one-way encryption and hence the Fujisaki-Okamoto result also applies if $\epsilon$ is semantically secure (IND-CPA).

We apply the Fujisaki-Okamoto transformation to BasicIdent and show that the resulting embodiment of an IBE system is IND-ID-CCA secure. We obtain the following IBE embodiment which we call FullIdent. Recall that n is the length of the message to be encrypted.

Setup: As in the BasicIdent scheme. In addition, we pick a hash function $H_3$: $\{0, 1\}^n \times \{0, 1\}^n \rightarrow \mathbb{Z}_q^*$, and a hash function $H_4$: $\{0, 1\}^n \rightarrow \{0, 1\}^n$.

Extract: As in the BasicIdent scheme.

Encrypt: To encrypt $M \in \{0, 1\}^n$ under the public key ID do the following: (1) compute $Q_{ID}=H_1(ID) \in \mathbb{G}_1^*$, (2) choose a random $\sigma \in \{0, 1\}^n$, (3) set $r=H_3(\sigma, M)$, and (4) set the ciphertext to be $C=<rP, \sigma \oplus H_2(g_{ID}^r), M \oplus H_4(\sigma)>$ where $g_{ID}=\hat{e}(Q_{ID}, P_{pub}) \in \mathbb{G}_2$ Decrypt: Let $C=<U, V, W>$ be a ciphertext encrypted using the public key ID. If $U \notin \mathbb{G}_1^*$ reject the ciphertext. To decrypt C using the private key $d_{ID} \in \mathbb{G}_1^*$ do:
  1. Compute $V \oplus H_2(\hat{e}(d_{ID}, U))=\sigma$.
  2. Compute $W \oplus H_4(\sigma)=M$.
  3. Set $r=H_3(\sigma, M)$. Test that $U=rP$. If not, reject the ciphertext.
  4. Output M as the decryption of C.

This completes the description of FullIdent. Its implementation follows the same basic pattern as BasicIdent shown in FIGS. 2, 3, 4. Note that M is encrypted as $W=M \oplus H_4(\sigma)$. This can be replaced by $W=E_{H_4(\sigma)}(M)$ where E is a semantically secure symmetric encryption scheme.

Security. The following theorem shows that FullIdent is a chosen ciphertext secure IBE (i.e. IND-ID-CCA), assuming BDH is hard in groups generated by $\mathcal{G}$.

Theorem 4 Let the hash functions $H_1$, $H_2$, $H_3$, $H_4$ be random oracles. Then FullIdent is a chosen ciphertext secure IBE (IND-ID-CCA) assuming BDH is hard in groups generated by $\mathcal{G}$.

Concretely, suppose there is an IND-ID-CCA adversary $\mathcal{A}$ that has advantage $\epsilon(k)$ against the scheme FullIdent and $\mathcal{A}$ runs in time at most $t(k)$. Suppose $\mathcal{A}$ makes at most $q_E$ extraction queries, at most $q_D$ decryption queries, and at most $q_{H_2}$, $q_{H_3}$, $q_{H_4}$ queries to the hash functions $H_2$, $H_3$, $H_4$ respectively. Then there is a BDH algorithm $\mathcal{B}$ for $\mathcal{G}$ with running time $t_1(k)$ where:

$$Adv_{\mathcal{G},\mathcal{B}}(k) \geq 2FO_{adv}\left(\frac{\epsilon(k)}{e(1+q_E+q_D)}, q_{H_4}, q_{H_3}, q_D\right)/q_{H_2}$$

$$t_1(k) \leq FO_{time}(t(k), q_{H_4}, q_{H_3})$$

where the functions $FO_{time}$ and $FO_{adv}$ are defined in Theorem 5.

The proof of Theorem 4 is based on the following result of Fujisaki and Okamoto. Let BasicPub$^{hy}$ be the result of applying the Fujisaki-Okamoto transformation to BasicPub.

Theorem 5 (Fujisaki-Okamoto) Suppose $\mathcal{A}$ is an IND-CCA adversary that achieves advantage $\epsilon(k)$ when attacking BasicPub$^{hy}$. Suppose $\mathcal{A}$ has running time $t(k)$, makes at most $q_D$ decryption queries, and makes at most $q_{H_3}$, $q_{H_4}$ queries to the hash functions $H_3$, $H_4$ respectively. Then there is an IND-CPA adversary $\mathcal{B}$ against BasicPub with running time $t_1(k)$ and advantage $\epsilon_1(k)$ where $$\epsilon_1(k) \geq FO_{adv}(\epsilon(k), q_{H_4}, q_{H_3}, q_D) = \frac{1}{2(q_{H_4}+q_{H_3})}[(\epsilon(k)+1)(1-2/q)^{q_D}-1]$$

$$t_1(k) \leq FO_{time}(t(k), q_{H_4}, q_{H_3}) = t(k) + O((q_{H_4}+q_{H_3})\cdot n),$$
and Here q is the size of the groups $\mathbb{G}_1$, $\mathbb{G}_2$ and n is the length of $\sigma$.

In fact, Fujisaki-Okamoto prove a stronger result: Under the hypothesis of Theorem 5, BasicPub$^{hy}$ would not even be a one-way encryption scheme. For our purposes the result in Theorem 5 is sufficient. To prove Theorem 4 we also need the following lemma to translate between an IND-ID-CCA chosen ciphertext attack on FullIdent and an IND-CCA chosen ciphertext attack on BasicPub$^{hy}$.

Lemma 6 Let $\mathcal{A}$ be an IND-ID-CCA adversary that has advantage $\epsilon(k)$ against FullIdent. Suppose $\mathcal{A}$ makes at most $q_E > 0$ private key extraction queries and at most $q_D$ decryption queries. Then there is an IND-CCA adversary $\mathcal{B}$ that has advantage at least $$\frac{\epsilon(k)}{e(1+q_E+q_D)}$$

against BasicPub$^{hy}$. Its running time is $O(time(\mathcal{A}))$.

Proof of Theorem 4. By Lemma 6 an IND-ID-CCA adversary on FullIdent implies an IND-CCA adversary on BasicPub$^{hy}$. By Theorem 5 an IND-CCA adversary on BasicPub$^{hy}$ implies an IND-CPA adversary on BasicPub. By Lemma 3 an IND-CPA adversary on BasicPub implies an algorithm for BDH. Composing all these reductions gives the required bounds. □

Relaxing the Hashing Requirements

Recall that an IBE system of Section uses a hash function $H_1: \{0,1\}^* \to \mathbb{G}_1^*$. The detailed example of an IBE system presented in the next section uses $\mathbb{G}_1$ as a subgroup of the group of points on an elliptic curve. In practice, it sometimes can be difficult to build hash functions that hash directly onto such groups. In an exemplary embodiment, we therefore show how to relax the requirement of hashing directly onto $\mathbb{G}_1^*$. Rather than hash onto $\mathbb{G}_1^*$ we hash onto some set $A \subseteq \{0,1\}^*$ and then use a deterministic encoding function to map A onto $\mathbb{G}_1^*$.

Admissible encodings: Let $\mathbb{G}_1$ be a group and let $A \in \{0,1\}^*$ be a finite set. We say that an encoding function $L: A \to \mathbb{G}_1^*$ is admissible if it satisfies the following properties:
1. Computable: There is an efficient deterministic algorithm to compute $L(x)$ for any $x \in A$.
2. 1-to-1: For any $y \in \mathbb{G}_1^*$ the preimage of y under L has size exactly l. In other words, $|L^{-1}(y)|=l$ for all $y \in \mathbb{G}_1^*$. Note that this implies that $|A|=l\cdot|\mathbb{G}_1^*|$.
3. Samplable: There is an efficient randomized algorithm $\mathcal{L}_S$ such that $\mathcal{L}_S(y)$ induces a uniform distribution on $L^{-1}(y)$ for any $y \in \mathbb{G}_1^*$. In other words, $\mathcal{L}_S(y)$ is a uniform random element in $L^{-1}(y)$.

We modify FullIdent to obtain an IND-ID-CCA secure embodiment of an IBE system where $H_1$ is replaced by a hash function into some set A. Since the change is relatively minor we refer to this new scheme as FullIdent':

Setup: As in the FullIdent embodiment. The only difference is that $H_1$ is replaced by a hash function $H'_1: \{0,1\}^* \to A$. The system parameters also include a description of an admissible encoding function $L: A \to \mathbb{G}_1^*$.

Extract, Encrypt: As in the FullIdent embodiment. The only difference is that in Step 1 these algorithms compute $Q_{ID}=L(H'_1(ID)) \in \mathbb{G}_1^*$.

Decrypt: As in the FullIdent embodiment.

This completes the description of FullIdent'. The following theorem shows that FullIdent' is a chosen ciphertext secure IBE (i.e. IND-ID-CCA), assuming FullIdent is.

Theorem 7 Let $\mathcal{A}$ be an IND-ID-CCA adversary on FullIdent' that achieves advantage $\epsilon(k)$. Suppose $\mathcal{A}$ makes at most $q_{H_1}$ queries to the hash function $H'_1$. Then there is an IND-ID-CCA adversary $\mathcal{B}$ on FullIdent that achieves the same advantage $\epsilon(k)$ and time($\mathcal{B}$)=time($\mathcal{A}$)+$q_{H_1}\cdot$time($L_S$)

Proof Sketch Algorithm $\mathcal{B}$ attacks FullIdent by running algorithm $\mathcal{A}$. It relays all decryption queries, extraction queries, and hash queries from $\mathcal{A}$ directly to the challenger and relays the challenger's response back to $\mathcal{A}$. It only behaves differently when $\mathcal{A}$ issues a hash query to $H'_1$. Recall that $\mathcal{B}$ only has access to a hash function $H_1: \{0,1\}^* \to \mathbb{G}_1^*$. To respond to $H'_1$ queries algorithm $\mathcal{B}$ maintains a list of tuples $<ID_i, y_i>$ as explained below. We refer to this list as the $(H'_1)^{list}$. The list is initially empty. When $\mathcal{A}$ queries the oracle $H'_1$ at a point $ID_i$ algorithm $\mathcal{B}$ responds as follows:
1. If the query $ID_i$ already appears on the $(H'_1)^{list}$ in a tuple $<ID_i, y_i>$ then respond with $H'_1(ID_i)=y_i \in A$.
2. Otherwise, $\mathcal{B}$ issues a query for $H_1(ID_i)$. Say, $H_1(ID_i)=\alpha \in \mathbb{G}_1^*$.

3. $\mathcal{B}$ runs the sampling algorithm $\mathcal{L}_S(\alpha)$ to generate a random element $y \in L^{-1}(\alpha)$.
4. $\mathcal{B}$ adds the tuple $<ID_i, y>$ to the $(H'_1)^{list}$ and responds to $\mathcal{A}$ with $H'_1(ID_i)=y \in A$. Note that y is uniformly distributed in A as required since $\alpha$ is uniformly distributed in $\mathbb{G}_1^*$ and L is an l-to-1 map.

Algorithm $\mathcal{B}$'s responses to all of $\mathcal{A}$'s queries, including $H'_1$ queries, are identical to $\mathcal{A}$'s view in the real attack. Hence, $\mathcal{B}$ will have the same advantage $\epsilon(k)$ in winning the game with the challenger. □

A DETAILED EXAMPLE OF AN IBE SYSTEM USING THE WEIL PAIRING

In this section we use FullIdent' to describe a detailed example of an embodiment of an IBE system. This embodiment is based on the Weil pairing. Although in practice the Tate pairing has computational advantages and may be used instead of the Weil pairing in various embodiments, the implementation using the Weil pairing will be described first because it is simpler. Later, the Tate pairing will be discussed.

Properties of the Weil Pairing

Let p>3 be a prime satisfying p=2 mod 3 and let q be some prime factor of p+1. Let E be the elliptic curve defined by the equation $y^2=x^3+1$ over $\mathbb{F}_p$. We state a few elementary facts about this curve E. From here on we let $E(\mathbb{F}_{p^r})$ denote the group of points on E defined over $\mathbb{F}_{p^r}$.

Fact 1: Since $x^3+1$ is a permutation on $\mathbb{F}_p$ it follows that the group $E(\mathbb{F}_p)$ contains p+1 points. We let O denote the point at infinity. Let $P \in E(\mathbb{F}_p)$ be a point of order q and let $\mathbb{G}_1$ be the subgroup of points generated by P.

Fact 2: For any $y_0 \in \mathbb{F}_p$ there is a unique point $(x_0, y_0)$ on $E(\mathbb{F}_p)$, namely $x_0 = (y_0^2-1)^{1/3} \in \mathbb{F}_p$. Hence, if (x,y) is a random non-zero point on $E(\mathbb{F}_p)$ then y is uniform in $\mathbb{F}_p$. We use this property to build a simple admissible encoding function.

Fact 3: Let $1 \neq \zeta \in \mathbb{F}_{p^2}$ be a solution of $x^3-1=0$ mod p. Then the map $\phi(x,y)=(\zeta x, y)$ is an automorphism of the group of points on the curve E. Note that for any point $Q=(x,y) \in E(\mathbb{F}_p)$ we have that $\phi(Q) \in E(\mathbb{F}_{p^2})$, but $\phi(Q) \notin E(\mathbb{F}_p)$. Hence, $Q \in E(\mathbb{F}_p)$ is linearly independent of $\phi(Q) \in E(\mathbb{F}_{p^2})$.

Fact 4: Since the points $P \in \mathbb{G}_1$ and $\phi(P)$ are linearly independent they generate a group isomorphic to $\mathbb{Z}_q \times \mathbb{Z}_q$. We denote this group of points by E[q].

Let $\mathbb{G}_2$ be the subgroup of $\mathbb{F}_{p^2}^*$ of order q. The Weil pairing on the curve $E(\mathbb{F}_{p^2})$ is a mapping $e: E[q] \times E[q] \to \mathbb{G}_2$. (This map is defined and discussed in the section below entitled Description of the Weil Pairing.) For any $Q, R \in E(\mathbb{F}_p)$ the Weil pairing satisfies e(Q, R)=1. In other words, the Weil pairing is degenerate on $E(\mathbb{F}_p)$, and hence degenerate on the group $\mathbb{G}_1$. To get a non-degenerate map we define the modified Weil pairing $\hat{e}: \mathbb{G}_1 \times \mathbb{G}_1 \to \mathbb{G}_2$ as follows:

$$\hat{e}(P, Q) = e(P, \phi(Q))$$

The modified Weil pairing satisfies the following properties:

1. Bilinear: For all P, $Q \in \mathbb{G}_1$ and for all a, $b \in \mathbb{Z}$ we have $\hat{e}(aP, bQ) = \hat{e}(P, Q)^{ab}$.
2. Non-degenerate: If P is a generator of $\mathbb{G}_1$ then $\hat{e}(P,P) \in \mathbb{F}_{p^2}^*$ is a generator of $\mathbb{G}_2$.
3. Computable: Given P, $Q \in \mathbb{G}_1$ there is an efficient algorithm to compute $\hat{e}(P, Q) \in \mathbb{G}_2$. (This algorithm is described in the section below entitled Description of the Weil Pairing.) Its running time is comparable to exponentiation in $\mathbb{F}_p$.

Although the the Computational Diffie-Hellman problem (CDH) appears to be hard in the group $\mathbb{G}_1$, the Decision Diffie-Hellman problem (DDH) is easy in $\mathbb{G}_1$.

BDH Parameter Generator $\mathcal{G}_1$: Given a security parameter $2<k \in \mathbb{Z}$ the BDH parameter generator picks a random k-bit prime q and finds the smallest prime p such that (1) p=2 mod 3, (2) q divides p+1, and (3) $q^2$ does not divide p+1. We write p=lq+1. The group $\mathbb{G}_1$ is the subgroup of order q of the group of points on the curve $y^2=x^3+1$ over $\mathbb{F}_p$. The group $\mathbb{G}_2$ is the subgroup of order q of $\mathbb{F}_{p^2}^*$. The bilinear map $\hat{e}: \mathbb{G}_1 \times \mathbb{G}_1 \to \mathbb{G}_2$ is the modified Weil pairing defined above.

The BDH parameter generator $\mathcal{G}_1$ is believed to satisfy the BDH assumption asymptotically. However, there is still the question of what values of p and q can be used in practice to make the BDH problem sufficiently hard. It is desirable that we can ensure, at the very least, that the discrete log problem in $\mathbb{G}_1$ is sufficiently hard. As pointed out earlier, the discrete log problem in $\mathbb{G}_1$ is efficiently reducible to discrete log in $\mathbb{G}_2$. Hence, computing discrete log in $\mathbb{F}_{p^2}^*$ is sufficient for computing discrete log in $\mathbb{G}_1$. In practice, for proper security of discrete log in $\mathbb{F}_{p^2}^*$ it is desirable to use primes p that are at least 512-bits long (so that the group size is at least 1024-bits long). Consequently, in some embodiments, this BDH parameter generator is used with primes p that may be 512-bits long or more.

An Admissible Encoding Function: MapToPoint

Let $\mathbb{G}_1, \mathbb{G}_2$ be two groups generated by $\mathcal{G}_1$ as defined above. Recall that an IBE system discussed earlier uses a hash function $H_1: \{0, 1\}^* \to \mathbb{G}_1^*$. It suffices to have a hash function $H_1: \{0, 1\}^* \to A$ for some set A, and an admissible encoding function $L: A \to \mathbb{G}_1^*$. In what follows the set A will be $\mathbb{F}_p$, and the admissible encoding function L will be called MapToPoint, which may be used in various embodiments of the present invention.

In this example, let p be a prime satisfying p=2 mod 3 and p=lq-1 for some prime q>3. In this exemplary embodiment, q does not divide l (i.e. $q^2$ does not divide p+1). Let E be the elliptic curve $y^2=x^3+1$ over $\mathbb{F}_p$. Let $\mathbb{G}_1$ be the subgroup of points on E of order q. In addition, a hash function $H_1: \{0, 1\}^* \to \mathbb{F}_p$ is provided.

In this exemplary embodiment, algorithm MapToPoint works as follows on input $y_0 \in \mathbb{F}_p$:
1. Compute $x_0 = (y_0^2-1)^{1/3} = (y_0^2-1)^{(2p-1)/3} \in \mathbb{F}_p$.
2. Let $Q=(x_0, y_0) \in E(\mathbb{F}_p)$ and set $Q_{ID}=lQ \in \mathbb{G}_1$.
3. Output MapToPoint$(y_0)=Q_{ID}$.

This completes the description of MapToPoint

We note that there are l-1 values of $y_0 \in \mathbb{F}_p$ for which $lQ=l(x_0, y_0)=O$ (these are the non-O points of order dividing l). Let $B \subset \mathbb{F}_p$ be the set of these $y_0$. When $H_1(ID)$ is one of these l-1 values $Q_{ID}$ is the identity element of $\mathbb{G}_1$. It is extremely unlikely for $H_1(ID)$ to hit one of these points—the probability is $1/q<1/2^k$. Hence, for simplicity we say that $H_1(ID)$ only outputs elements in $\mathbb{F}_p \backslash B$, i.e. $H_1: \{0, 1\}^* \to \mathbb{F}_p \backslash B$. In other embodiments, algorithm MapToPoint can be easily extended to handle the values $y_0 \in B$ by hashing ID multiple times using different hash functions.

Proposition 8 MapToPoint: $\mathbb{F}_p \backslash B \to \mathbb{G}_1^*$ is an admissible encoding function.

Proof The map is clearly computable and is a 1-to-1 mapping. It remains to show that L is samplable. Let P be a generator of $E(\mathbb{F}_p)$. Given a $Q \in \mathbb{G}_1^*$ the sampling algorithm $\mathcal{L}_s$ does the following: (1) pick a random $b \in \{0, \ldots, l-1\}$, (2) compute $Q' = l^{-1} \cdot Q + bqP = (x,y)$, and (3) output $\mathcal{L}_s(Q)=y \in \mathbb{F}_p$. Here $l^{-1}$ is the inverse of l in $\mathbb{Z}_q^*$. This algorithm outputs a random element from the l elements in MapToPoint$^{-1}$(Q) as required. □

A Detailed Example of an IBE System

Using the BDH parameter generator $\mathcal{G}_1$ and the admissible encoding function MapToPoint we obtain the following detailed example of an embodiment of an IBE system.

Setup: Given a security parameter $k \in \mathbb{Z}^+$, the algorithm works as follows:

Step 1: Run $\mathcal{G}_1$ on input k to generate a k-bit prime q and a prime p=2 mod 3 such that q divides p+1. Let E be the elliptic curve defined by $y^2=x^3+1$ over $\mathbb{F}_p$. Choose an arbitrary $P \in E(\mathbb{F}_p)$ of order q.

Step 2: Pick a random $s \in \mathbb{Z}_q^*$ and set $P_{pub}=sP$.

Step 3: Pick four hash functions: $H_1$: $\{0, 1\}^* \to \mathbb{F}_p$; $H_2$: $\mathbb{F}_{p^2} \to \{0, 1\}^n$ for some n; $H_3$: $\{0, 1\}^n \times \{0, 1\}^n \to \mathbb{Z}_q^*$, and a hash function $H_4$: $\{0, 1\}^n \to \{0, 1\}^n$.

The message space is $\mathcal{M}=\{0, 1\}^n$. The ciphertext space is $C=E(\mathbb{F}_p) \times \{0, 1\}^n$. The system parameters are params=<p, q, n, P, $P_{pub}$, $H_1$, ..., $H_4$>. The master-key is $s \in \mathbb{Z}_q^*$.

Extract: For a given string $ID \in \{0, 1\}^*$ the algorithm builds a private key d as follows:

Step 1: Compute MapToPoint($H_1$(ID))=$Q_{ID} \in E(\mathbb{F}_p)$ of order q.

Step 2: Set the private key $d_{ID}$ to be $d_{ID}=sQ_{ID}$ where s is the master key.

Encrypt: To encrypt $M \in \{0, 1\}^n$ under the public key ID do the following:

Step 1: Compute MapToPoint($H_1$(ID))=$Q_{ID} \in E(\mathbb{F}_p)$ of order q.

Step 2: Choose a random $\sigma \in \{0, 1\}^n$.

Step 3: Set $r=H_3(\sigma, M)$.

Step 4: Set the ciphertext to be $$C=<rP, \sigma \oplus H_2(g_{ID}^r), M \oplus H_4(\sigma)> \text{ where } g_{ID}=\hat{e}(Q_{ID}, P_{pub}) \in \mathbb{F}_{p^2}.$$

Decrypt: Let $C=<U, V, W> \in C$ be a ciphertext encrypted using the public key ID. If $U \in E(\mathbb{F}_p)$ is not a point of order q reject the ciphertext. To decrypt C using the private key $d_{ID}$ do:

Step 1. Compute $V \oplus H_2(\hat{e}(d_{ID}, U))=\sigma$.

Step 2. Compute $W \oplus H_4(\sigma)=M$.

Step 3. Set $r=H_3(\sigma, M)$. Test that U=rP. If not, reject the ciphertext.

Step 4. Output M as the decryption of C.

Performance. In this embodiment, algorithms Setup and Extract are very simple. At the heart of both algorithms is a standard multiplication on the curve $E(\mathbb{F}_p)$. Algorithm Encrypt requires that the encryptor compute the Weil pairing of $Q_{ID}$ and $P_{pub}$. Note that this computation is independent of the message, and hence can be done once and for all. Once $g_{ID}$ is computed the performance of this embodiment is almost identical to standard ElGamal encryption. We also note that the ciphertext length of the exemplary embodiment of BasicIdent is the same as in regular ElGamal encryption in $\mathbb{F}_p$. Decryption is a simple Weil pairing computation.

Security. The security of the detailed exemplary embodiment just described follows directly from Theorem 4 and Theorem 7.

Corollary 9 The detailed exemplary embodiment described above is a chosen ciphertext secure IBE system (i.e. IND-ID-CCA in the random oracle model) assuming the BDH parameter generator $\mathcal{G}_1$ satisfies the BDH assumption.

EXTENSIONS AND OBSERVATIONS

Tate Pairing and Other Curves

Embodiments of our IBE system work with efficiently computable bilinear maps $\hat{e}$: $\mathbb{G}_1 \times \mathbb{G}_1 \to \mathbb{G}_2$ between two groups $\mathbb{G}_1$, $\mathbb{G}_2$ where the BDH assumption holds. Many different elliptic curves may give rise to such maps. For example, one could use the curve $y^2=x^3+x$ over $\mathbb{F}_p$ with p=3 mod 4 and its endomorphism $\phi$: $(x,y) \to (-x, iy)$ where $i^2=-1$.

In an alternative embodiment, one may use a family of nonsupersingular elliptic curves over $\mathbb{F}_p$ discussed by Miyaji et al. (A. Miyaji, M. Nakabayashi, S. Takano, "New explicit condition of elliptic curve trace for FR-reduction", *IEICE Trans. Fundamentals*, Vol. E84 A, No. 5, May 2001). For example, to use a curve $E/\mathbb{F}_p$ in this family one can take $\mathbb{G}_1$ to be a cyclic subgroup of $E(\mathbb{F}_{p^6})$ (that is not contained in $E(\mathbb{F}_p)$) and then use the trace map on the curve E as the endomorphism $\phi$ used to define the pairing $\hat{e}$. We also note that both encryption and decryption in FullIdent can be made faster in alternate embodiments by using the Tate pairing on elliptic curves rather than the Weil pairing. In other embodiments, suitable bilinear maps may be derived from abelian varieties.

Asymmetric Pairings

As mentioned earlier, embodiments of our IBE system are not limited to symmetric maps, but may include asymmetric maps as well. In other words, embodiments generally may use maps of the form $\hat{e}$: $\mathbb{G}_0 \times \mathbb{G}_1 \to \mathbb{G}_2$ where $\mathbb{G}_0$, $\mathbb{G}_1$ are groups of prime order q. When $\mathbb{G}_0$ and $\mathbb{G}_1$ are equal we say the map is symmetric. When $\mathbb{G}_0$ and $\mathbb{G}_1$ are not equal we say the map is asymmetric.

The elements $Q_{ID}$ and P in the asymmetric case are members of $\mathbb{G}_0$ and $\mathbb{G}_1$, respectively (or vice versa), and the target group of the hash function $H_1$ is selected accordingly. However, to make the proof of security go through (Lemma 2 in particular) we use a slightly strange looking complexity assumption which we call the co-BDH assumption: given random P,aP,bP$\in \mathbb{G}_1$ and Q,aQ,cQ$\in \mathbb{G}_0$ no polynomial time algorithm can compute $\hat{e}(P, Q)^{abc}$ with non-negligible probability. If one is uses this assumption then for embodiments using a curve $E/\mathbb{F}_p$ from Miyaji et al. (as just described above) one can take $\mathbb{G}_1$ to be a cyclic subgroup of $E(\mathbb{F}_p)$ of order q and $\mathbb{G}_0$ to be a different cyclic subgroup of $E(\mathbb{F}_{p^6})$ of order q. This will result in a more efficient system than the method described in the preceding paragraph for using these curves.

Distributed PKG

In exemplary embodiments of an IBE system it is desirable that the master-key stored at the PKG be protected. One way of protecting this key is by distributing it among different sites using techniques of threshold cryptography. Embodiments of our IBE system support this in a very efficient and robust way. Recall that in some embodiments discussed above, the master-key may be some $s \in \mathbb{Z}_q^*$ and the PKG uses the group action to compute a private key from s and $Q_{ID}$, where $Q_{ID}$ is derived from the user's public key ID. For example, $d_{ID}=sQ_{ID}$. A distributed PKG embodiment can be implemented in a t-out-of-n fashion by giving each of the n PKGs one share $s_i$ of a Shamir secret sharing of s mod q. Each of the n PKGs can use its share $s_i$ of the master key to generate a corresponding share $d_i$ of a private key $d_{ID}$ by calculating $d_i=s_iQ_{ID}$. The user can then construct the entire private key $d_{ID}$ by requesting from t of the n PKGs its share $d_i$ of the private key, then combining the shares by calculating $$d_{ID} = \sum_i \lambda_i d_i,$$

where the $\lambda_i$'s are the appropriate Lagrange interpolation coefficients.

Furthermore, it is easy to make this embodiment robust against dishonest PKGs using the fact that DDH is easy in $\mathbb{G}_1$. During setup each of the n PKGs publishes $P_i = s_i P$. During a key generation request the user can verify that the response from the i'th PKG is valid by testing that:

$$\hat{e}(d_i, P) = \hat{e}(Q_{ID}, P_i)$$

Thus, a misbehaving PKG will be immediately caught. There is no need for zero-knowledge proofs as in regular robust threshold schemes. The PKG's master-key can be generated in a distributed fashion using the techniques of R. Gennaro et al. (R. Gennaro, S. Jarecki, H. Krawczyk, T. Rabin, "Secure Distributed Key Generation for Discrete-Log Based Cryptosystems", *Advances in Cryptology—Eurocrypt '99*, Lecture Notes in Computer Science, Vol. 1592, Springer-Verlag, pp. 295–310, 1999). Using this technique, the PKGs can execute a cooperative protocol that allows them to jointly generate their respective shares of the master key without the master key ever existing in any one place.

Note that a distributed master-key embodiment also enables threshold decryption on a per-message basis, without any need to derive the corresponding decryption key. For example, threshold decryption of BasicIdent ciphertext (U,V) is straightforward if each PKG responds with $\hat{e}(s_i Q_{ID}, U)$.

Figure 5:
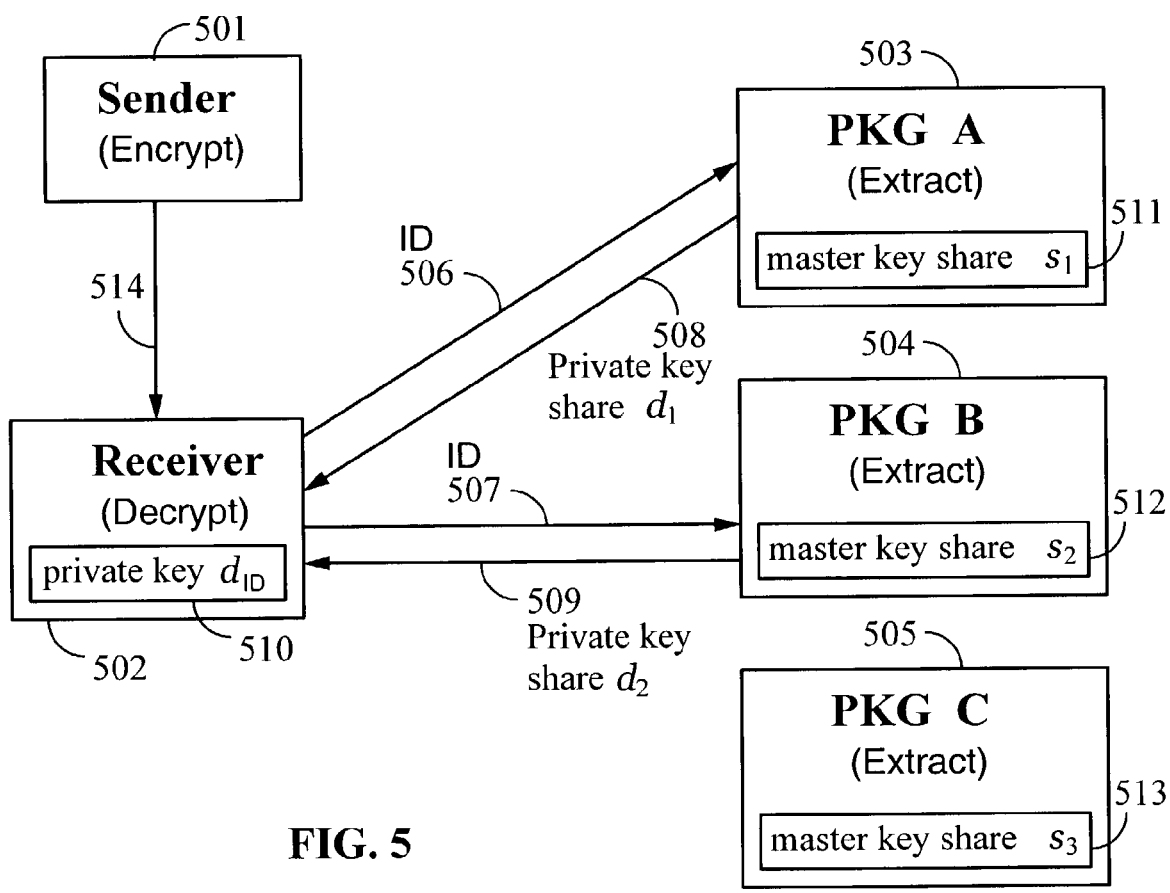
FIG. 5 is a block diagram illustrating a distributed PKG, according to an embodiment of the invention.

FIG. 5 is a block diagram illustrating a distributed PKG system, according to an embodiment of the invention. FIG. 5 includes a sender system 501, receiver system 502 and three PKGs (PKG A 503, PKG B 504 and PKG C 505). In one embodiment illustrating a 2-out-of-3 sharing, each of three PKGs contains a different share of a master key, and any two of the three are able to derive the master key. As shown in the figure, PKG A 503, PKG B 504, and PKG C 505 include, respectively, master key share $s_1$, 511, master key share $s_2$, 512, and master key share $s_3$, 513. In 2-out-of-3 sharing, any two out of these three PKGs could combine their shares to determine the master key, although in this embodiment each PKG secretly holds its master key share.

Sender system 501 sends a message to receiver 502. The message 514 may be encrypted using a public key based on an identifier ID of the receiver. In order to obtain the corresponding private key, the receiver system queries two of the three PKGs using, for example, the receiver's identity or public key. As shown in the figure, receiver system 502 makes queries 506 and 507 to PKG A 503 and PKG B 504, respectively, in order to obtain two shares of the private key. In response to the queries, PKG A 503 and PKG B 504 return, respectively, share $d_1$, 508, and share $d_2$, 509, of private key d, 510. Receiver system 502 is then able to assemble the corresponding private key $d_{ID}$, which corresponds to the public key with which the message 514 was encrypted. More generally, the receiver could have selected to query any two of the three PKGs. For example, receiver system 502 alternatively could have queried PKGs B and C and combined private key shares $d_2$ and $d_3$ to produce the private key 510. These techniques easily generalize to provide similar embodiments using t-out-of-n sharing.

Sender system 501, receiver system 502 as well as PKGs 503, 504 and 505 may be each implemented as computer systems which include elements such as processors and computer-readable media such as memory and other storage devices. Communication between the respective elements may take place using data packets sent over data networks, or any of various other forms of electronic and data transmission and communication. The communication may transpire over various architectures of communication, such as a computer network, such as the Internet, with various wired, wireless and other communications media.

Working in Subgroups

In an alternative embodiment of the detailed IBE system described above, performance may be improved by working in a comparatively small subgroup of the curve. For example, choose a 1024-bit prime p=2 mod 3 with p=aq−1 for some 160-bit prime q. The point P is then chosen to be a point of order q. Each public key ID is converted to a group point by hashing ID to a point Q on the curve and then multiplying the point by a. The system is secure if the BDH assumption holds in the group generated by P. The advantage of this embodiment is that the Weil computation is done on points of small order, and hence is much faster.

IBE Implies Signatures

Various IBE techniques described above can be used to provide public key signature systems and methods. The intuition is as follows. The private key for the signature scheme is the master key for the IBE scheme. The public key for the signature scheme is the set of global system parameters for the IBE scheme. The signature on a message M is the IBE decryption key for ID=M. To verify a signature, choose a random message M', encrypt M' using the public key ID=M, and then attempt to decrypt using the given signature on M as the decryption key. If the IBE system is IND-ID-CCA, then the signature scheme is existentially unforgeable against a chosen message attack. Note that, unlike most signature schemes, this signature verification embodiment is randomized. This shows that the IBE techniques described herein may encompass both public key encryption and digital signatures. Signature schemes derived from these approaches can be used to provide interesting properties, as described by Boneh et al. (D. Boneh, B. Lynn, H. Shacham, "Short signatures from the Weil pairing", in *Advances in Cryptology—AsiaCrypt* 2001, Lecture Notes in Computer Science, Vol. 2248, Springer-Verlag, pp. 514–532, 2001, which is incorporated herein by reference).

Escrow ElGamal Encryption

In this section we show that various IBE techniques described above can be used to provide an ElGamal encryption system embodiment having global escrow capability. In this embodiment, a single escrow key enables the decryption of ciphertexts encrypted under any public key.

In one exemplary embodiment, the ElGamal escrow system works as follows. The Setup is similar to that for BasicIdent. Unlike the identity-based BasicIdent, each user selects a secret random number and uses it to generate a public/private key pair. A sender and receiver can then use Encrypt and Decrypt to communicate an encrypted message. The message is secure except for an escrow who can use a master key s to decrypt the message.

Figure 6:
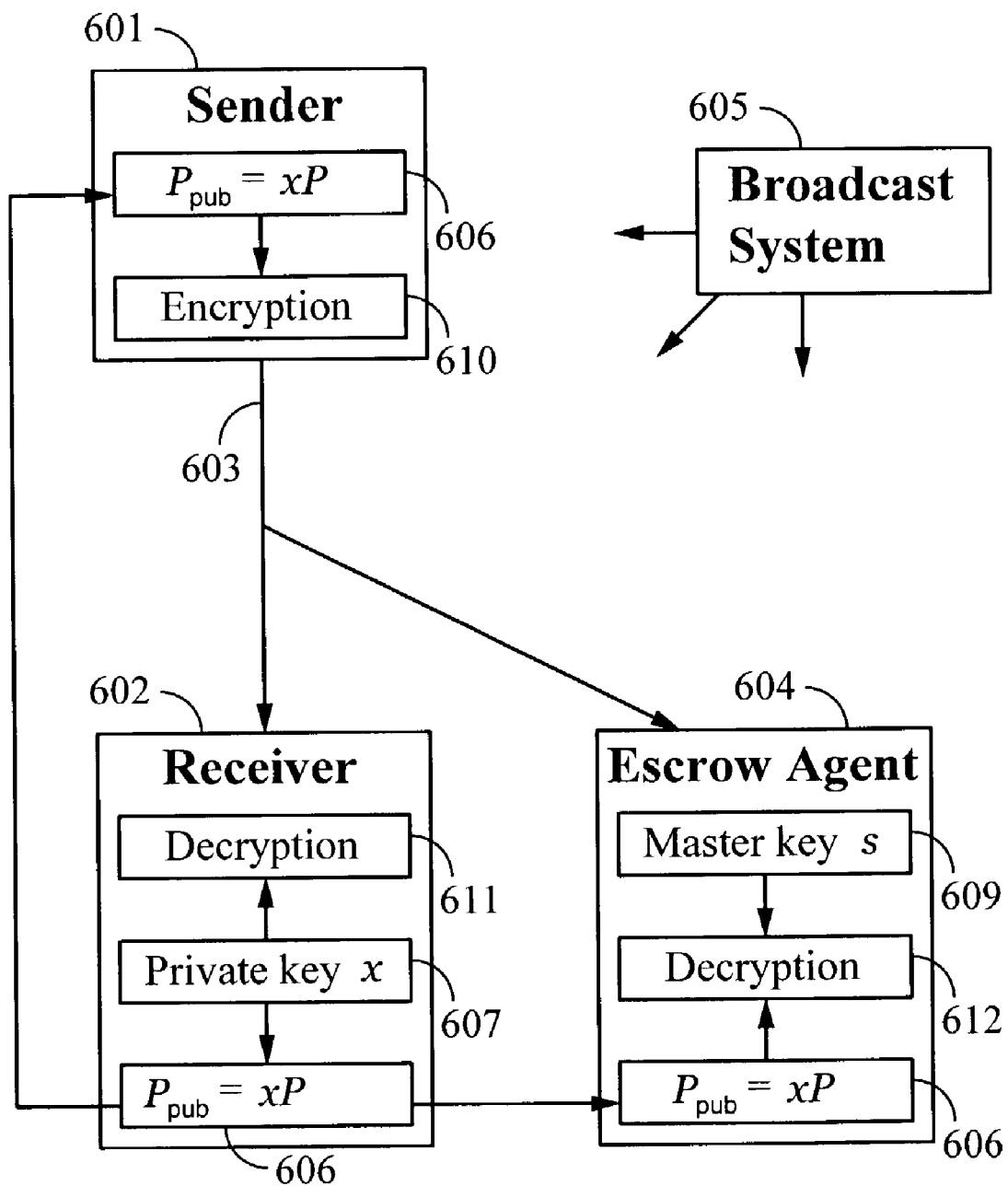
FIG. 6 is a block diagram illustrating elements in a cryptosystem with escrow decryption capability according to an embodiment of the invention.

FIG. 6 is a block diagram illustrating elements in a cryptosystem with escrow decryption capability according to an embodiment of the invention. The system includes a sender system 601 with encryption logic 610, receiver system 602 with decryption logic 611, escrow agent system 604 and broadcasting system 605. Broadcast system 605 sends system parameters to participants such as escrow agent system 604, receiver system 602 and sender system 601. The receiver system 602 selects a private key x, 607, and uses it to generate a public key $P_{pub}$=xP, 606, which is then published. The private key x and the public key $P_{pub}$ form a complementary key pair. Using the public key $P_{pub}$=xP, 606, sender system 601 encrypts a message M with encryption logic 610. Sender system 601 sends a resulting encrypted message 603 to receiver 602. Receiver system 602 decrypts the message with decryption logic 611 using the private key x, 607. Escrow agent system 604 may intercept message 603 and, using the escrow agent key s, 609, public key $P_{pub}$=xP, 606, and decrypt message 603 with decryption logic 612. In an alternate embodiment, broadcast system 605 and escrow agent 604 may be a single entity. In yet another embodiment, the escrow agent key s may be shared in a manner such as in the distributed PKG embodiments described earlier.

In more detail, an exemplary embodiment of the technique involves the following procedures:

Setup: Let $\mathcal{G}$ be some BDH parameter generator. Given a security parameter k∈$\mathbb{Z}^+$, the algorithm works as follows:
  Step 1: Run $\mathcal{G}$ on input k to generate a prime q, two groups $\mathbb{G}_1$, $\mathbb{G}_2$ of order q, and an admissible map ê: $\mathbb{G}_1 \times \mathbb{G}_1 \to \mathbb{G}_2$. Let P be some generator of $\mathbb{G}_1$.
  Step 2: Pick a random s∈$\mathbb{Z}_q^*$ and set Q=sP.
  Step 3: Choose a cryptographic hash function H: $\mathbb{G}_2 \to \{0, 1\}^n$.
  The message space is $\mathcal{M}=\{0, 1\}^n$. The ciphertext space is C=$\mathbb{G}_1 \times \{0, 1\}^n$. The system parameters are params=<q, $\mathbb{G}_1$, $\mathbb{G}_2$, ê, n, P, Q, H>. The escrow key is s∈$\mathbb{Z}_q^*$, keygen: A user generates a public/private key pair for herself by picking a random x∈$\mathbb{Z}_q^*$ and computing $P_{pub}$=xP∈$\mathbb{G}_1$. Her private key is x (or xQ), her public key is $P_{pub}$.

Encrypt: To encrypt M∈$\{0, 1\}^n$ under the public key $P_{pub}$ do the following: (1) pick a random r∈$\mathbb{Z}_q^*$, and (2) set the ciphertext to be:

$C=<rP, M \oplus H(g^r)>$ where $g=\hat{e}(P_{pub}, Q) \in \mathbb{G}_2$.

Figure 7:
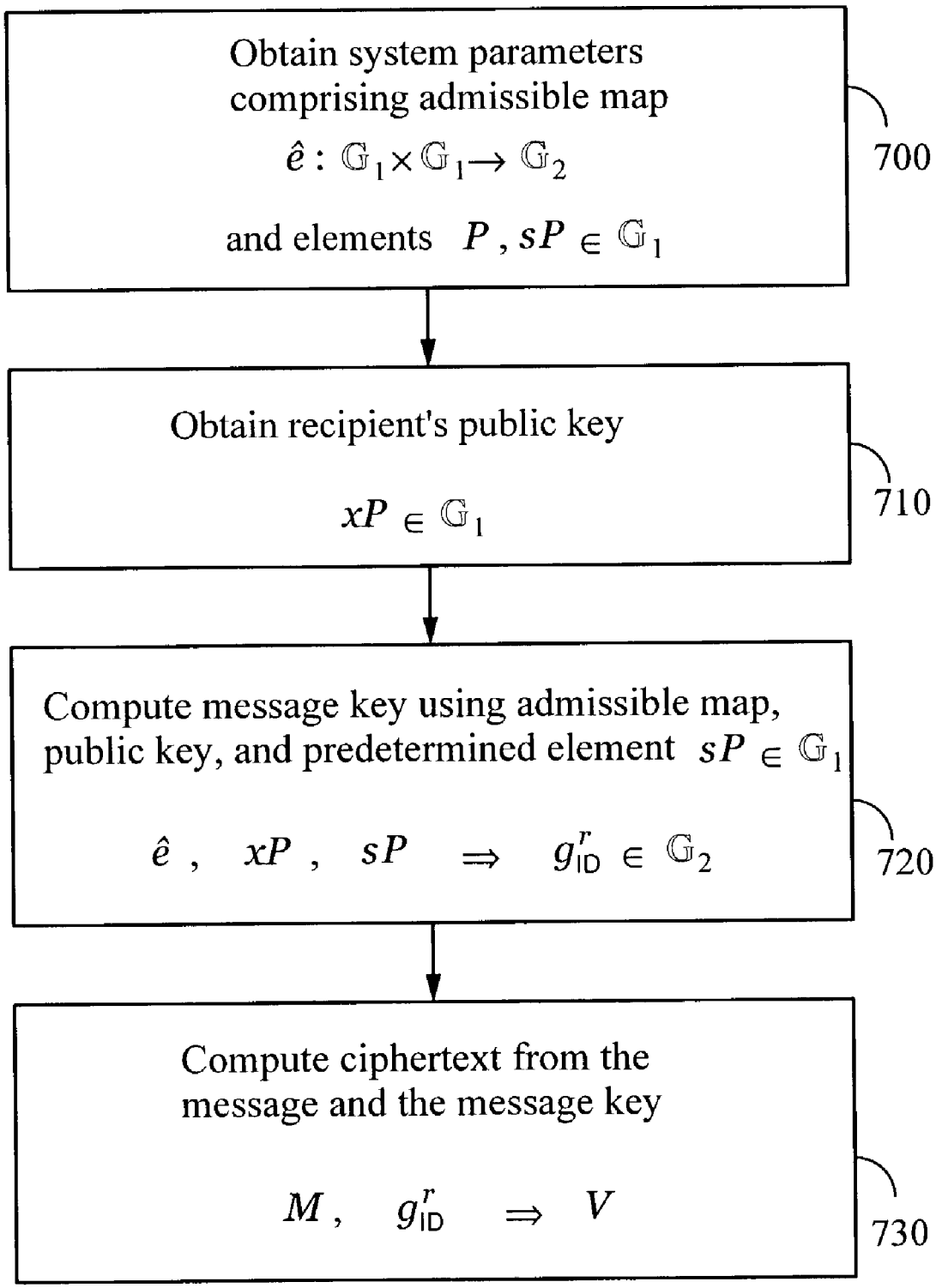
FIG. 7 is a block diagram illustrating steps performed by a sender when encrypting messages in an ElGamal cryptosystem with escrow decryption capability according to an embodiment of the invention.

This encryption technique is also illustrated in FIG. 7, where the sender obtains the system parameters and elements P and Q=sP in block 700, and obtains the recipient's public key $P_{pub}$=xP in block 710. The sender then selects a random r and computes a message key in block 720. The message key is then used to encrypt a message in block 730. The sender then transmits an encapsulated key rP and encrypted message V to the receiver.

Decrypt: Let C=<U,V> be a ciphertext encrypted using $P_{pub}$. Then U∈$\mathbb{G}_1$. To decrypt C using the private key x do:

$V \oplus H(\hat{e}(U,xQ))=M$.

Figure 8:
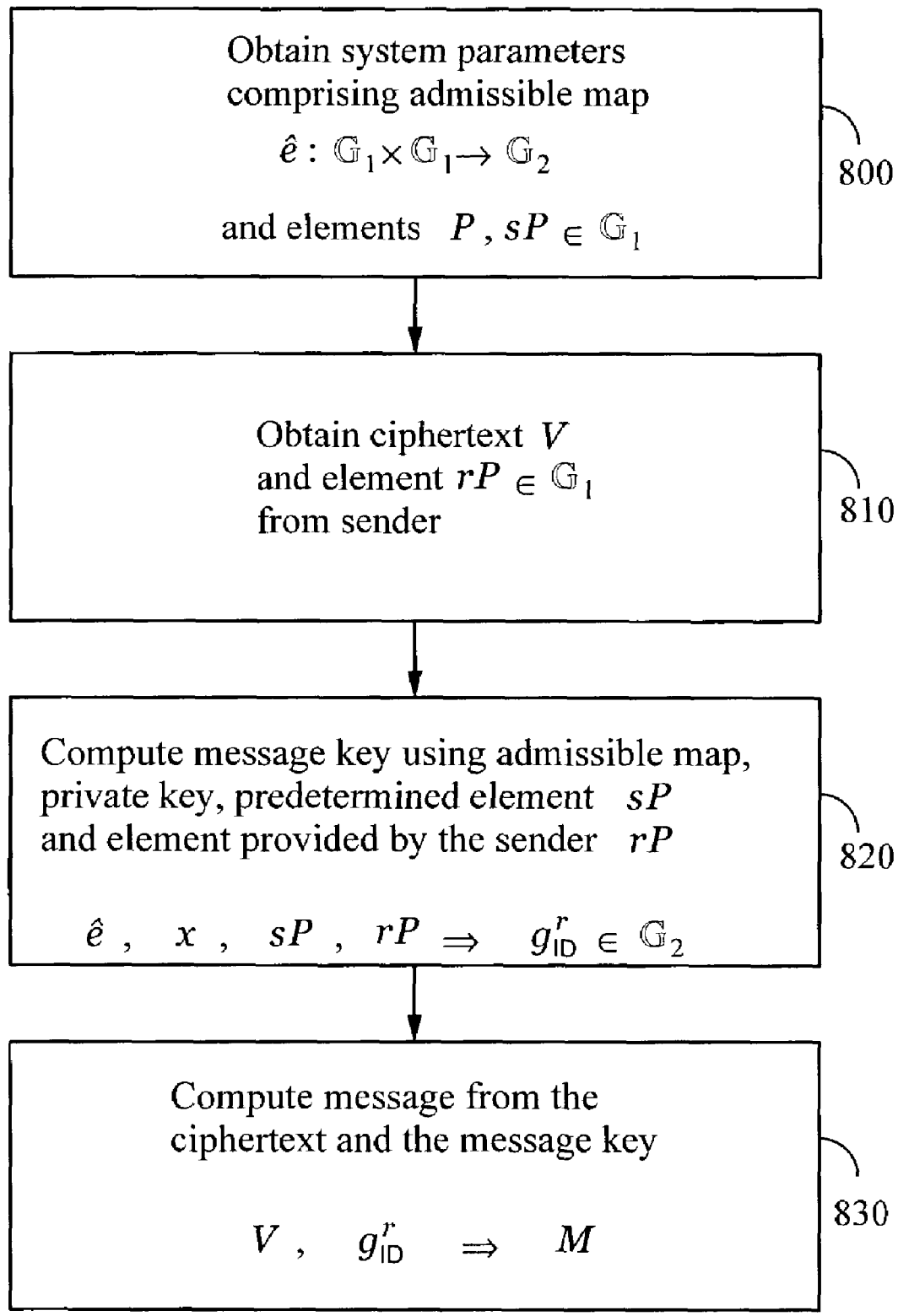
FIG. 8 is a block diagram illustrating steps performed by a receiver when decrypting messages in an ElGamal cryptosystem with escrow decryption capability according to an embodiment of the invention.

As illustrated in FIG. 8, the receiver obtains the system parameters and elements P and Q=sP in block 800, then obtains the encrypted message V and encapsulated key rP from the sender in block 810. The receiver then computes the message key in block 820, and uses it to decrypt the message in block 830.

To see that the message keys computed by the sender and receiver are the same, note that the sender knows the secret r as well as the public Q=sP and $P_{pub}$=xP, and uses these to compute a key from $\hat{e}(sP,xP)^r$. The receiver, on the other hand, knows the secret x as well as the public Q=sP and rP, and uses these to compute a message key from $\hat{e}(rP,x(sP))$. The bilinearity of ê implies that $\hat{e}(sP,xP)^r=\hat{e}(rP,x(sP))$, so the sender and receiver compute the same message key.

Escrow-decrypt: The purpose of this embodiment is to permit escrow decryption of otherwise secure communications. To decrypt C=<U,V> using the escrow key s, compute:

$V \oplus H(\hat{e}(U, sP_{pub}))=M$.

Figure 9:
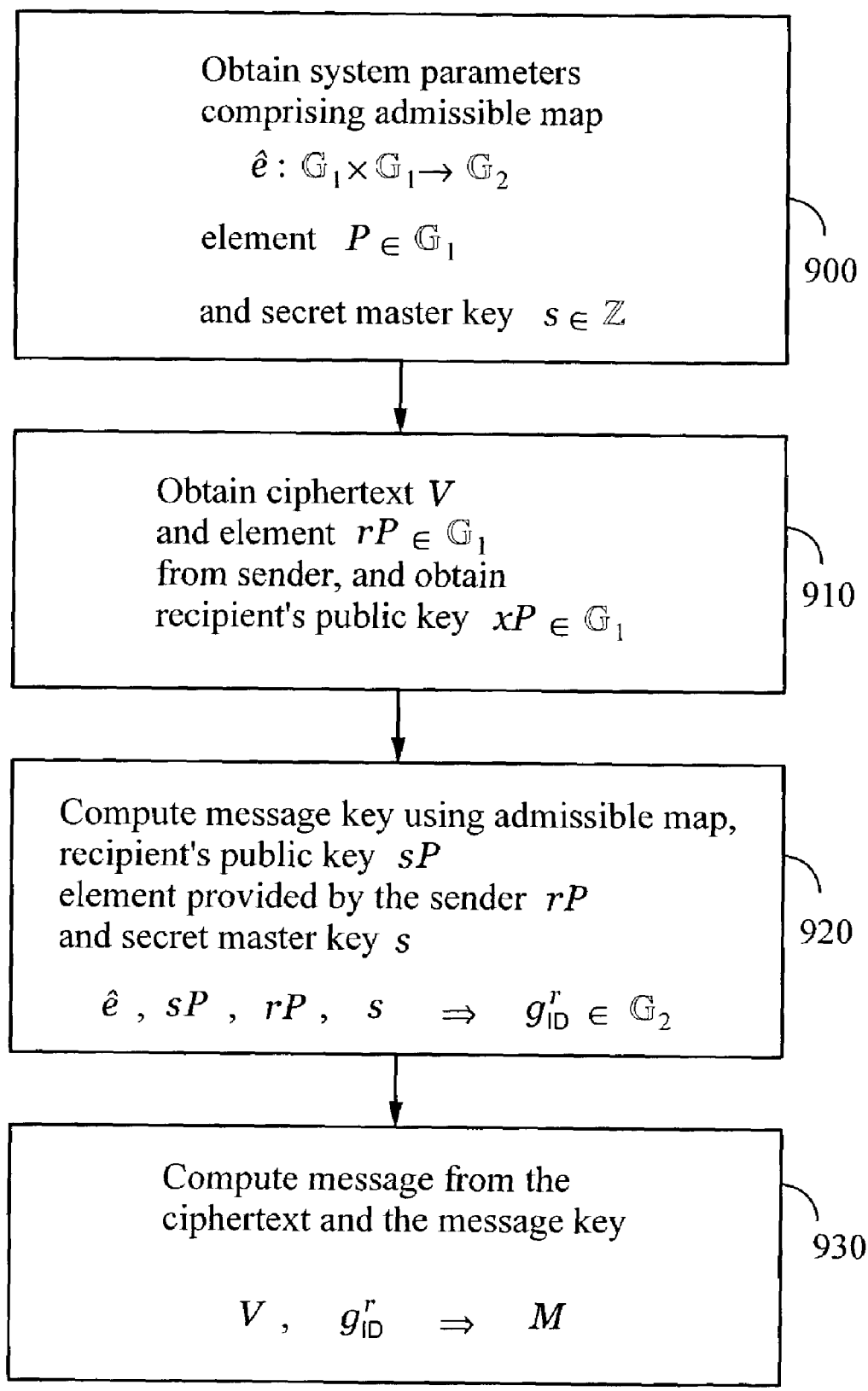
FIG. 9 is a block diagram illustrating steps performed by an escrow when decrypting messages in an ElGamal cryptosystem with escrow decryption capability according to an alternate embodiment of the invention.

As shown in FIG. 9, the escrow obtains the system parameters and element P in block 900, then in block 910 obtains the recipient's public key xP, and obtains the encrypted message V and encapsulated key rP from the sender. The escrow then computes the message key in block 920, and uses it to decrypt the message in block 930. The escrow can compute the message key from the knowledge of s, rP, and xP.

A standard argument shows that assuming that BDH is hard for groups generated by $\mathcal{G}$ the system of this embodiment has semantic security in the random oracle model (recall that since DDH is easy we cannot prove semantic security based on DDH). Yet, the escrow agent can decrypt any ciphertext encrypted using any user's public key. The decryption capability of the escrow agent can be distributed using the PKG distribution techniques described earlier.

Another embodiment uses a similar hardness assumption, with an ElGamal encryption system with non-global escrow. In this embodiment, each user constructs a public key with two corresponding private keys, and gives one of the private keys to the trusted third party. The trusted third party maintains a database of all private keys given to it by the various users. Although both private keys can be used to decrypt, only the user's private key can be used simultaneously as the signing key for a discrete logarithm based signature scheme.

Various other cryptographic systems can be devised based on the principles illustrated in the above embodiments. For example, three entities A, B, and C can communicate securely as a group by privately selecting random integers a, b, c and publishing public keys aP, bP, cP. One of them, such as A, could encrypt a message using the message key $\hat{e}(bP,cP)^a$ and transmit it with rP. Then B could decrypt the message by calculating $\hat{e}(cP,rp)^b$ and C could decrypt it by calculating $\hat{e}(bP,rP)^c$. Similarly, B could send a message to A and C, or C could send a message to A and B.

In another possible embodiment, two of the three entities, say A and B, could publish a joint public key abP. Then C could encrypt a message using the message key $\hat{e}(abP,cP)^r$ and transmit it with rP. Then neither A nor B alone could decrypt the message, but both A and B together could compute $\hat{e}(cP,rp)^{ab}$ and jointly decrypt the message. This technique generalizes to any number of entities. For example, C could join A and B by using abP to compute and publish the three-way joint public key abcP. Then anyone could encrypt a message using the message key $\hat{e}(abcP,xP)^r$ and transmit it with rP. Then only A and B and C together could compute $\hat{e}(xP,rP)^{abc}$ and jointly decrypt the message.

Threshold Decryption

Embodiments of the invention enable n entities to have shares of a private key $d_{ID}$ corresponding to a given public key ID, so that messages encrypted using ID can only be decrypted if t of the n entities collaborate. The private key $d_{ID}$ is never reconstructed in a single location. Embodiments of our IBE system may support this as follows.

Recall that in other embodiments the private key $d_{ID}=sQ_{ID}$ where $s \in \mathbb{Z}_q^*$ is the master-key. Instead, let $s_1, \ldots, s_n \in \mathbb{Z}_q^*$ be a t-out-of-n Shamir secret sharing of the master-key s. Each of the n users is given $d_i = s_i Q_{ID}$. To decrypt a ciphertext <U,V> encrypted using the key ID each user locally computes $g_i = \hat{e}(U, d_i)$ and sends $g_i \in \mathbb{G}_2$ to the user managing the decryption process. That user then combines the decryption shares by computing $g_{ID} = \Pi_i g_i^{\lambda_i}$ where $\lambda_i$ are the appropriate Lagrange interpolation coefficients used in Shamir secret sharing. The message is then obtained by computing $H_2(g_{ID}) \oplus V = M$.

Those skilled in the art of cryptography will be able to devise many other schemes that employ the basic principles of the present invention.

APPLICATIONS OF IDENTITY-BASED ENCRYPTION

One application for embodiments of identity-based encryption is to help the deployment of a public key infrastructure. In this section, we show several embodiments of this and other applications.

Revocation of Public Keys

In this embodiment, the sender may encrypt using a public key derived from a piece of information containing a time element, such as a year, date or other time, to help provide key expiration or other forms of temporal key management. For example, in one embodiment, key expiration can be done by having Alice encrypt e-mail sent to Bob using the public key: "bob@company.com||current-year". In doing so Bob can use his private key during the current year only. Once a year Bob needs to obtain a new private key from the PKG. Hence, we get the effect of annual private key expiration. Note that unlike the existing public key infrastructure, Alice does not need to obtain a new certificate from Bob every time Bob refreshes his private key.

One may make this approach more granular in other embodiments by encrypting e-mail for Bob using "bob@company.com||current-date", or using another time stamp. This forces Bob to obtain a new private key every day. This embodiment may be used in a corporate context where the PKG is maintained by the corporation. With this approach key revocation is very simple: when Bob leaves the company and his key needs to be revoked, the corporate PKG is instructed to stop issuing private keys for Bob's e-mail address. As a result, Bob can no longer read his email. The interesting property is that Alice does not need to communicate with any third party certificate directory to obtain Bob's daily public key. Hence, embodiments of identity based encryption can provide a very efficient mechanism for implementing ephemeral public keys. Also note that this embodiment can be used to enable Alice to send messages into the future: Bob will only be able to decrypt the e-mail on the date specified by Alice.

Managing User Credentials

An embodiment of the invention enables the management of user credentials using an IBE system. The message is encrypted with a string containing a credential identifier. For example, suppose Alice encrypts mail to Bob using the public key: "bob@company.com||current-year||clearance=secret". Then Bob will only be able to read the email if on the specified date he has secret clearance. Consequently, it is very easy to grant and revoke user credentials using the PKG.

Figure 10:
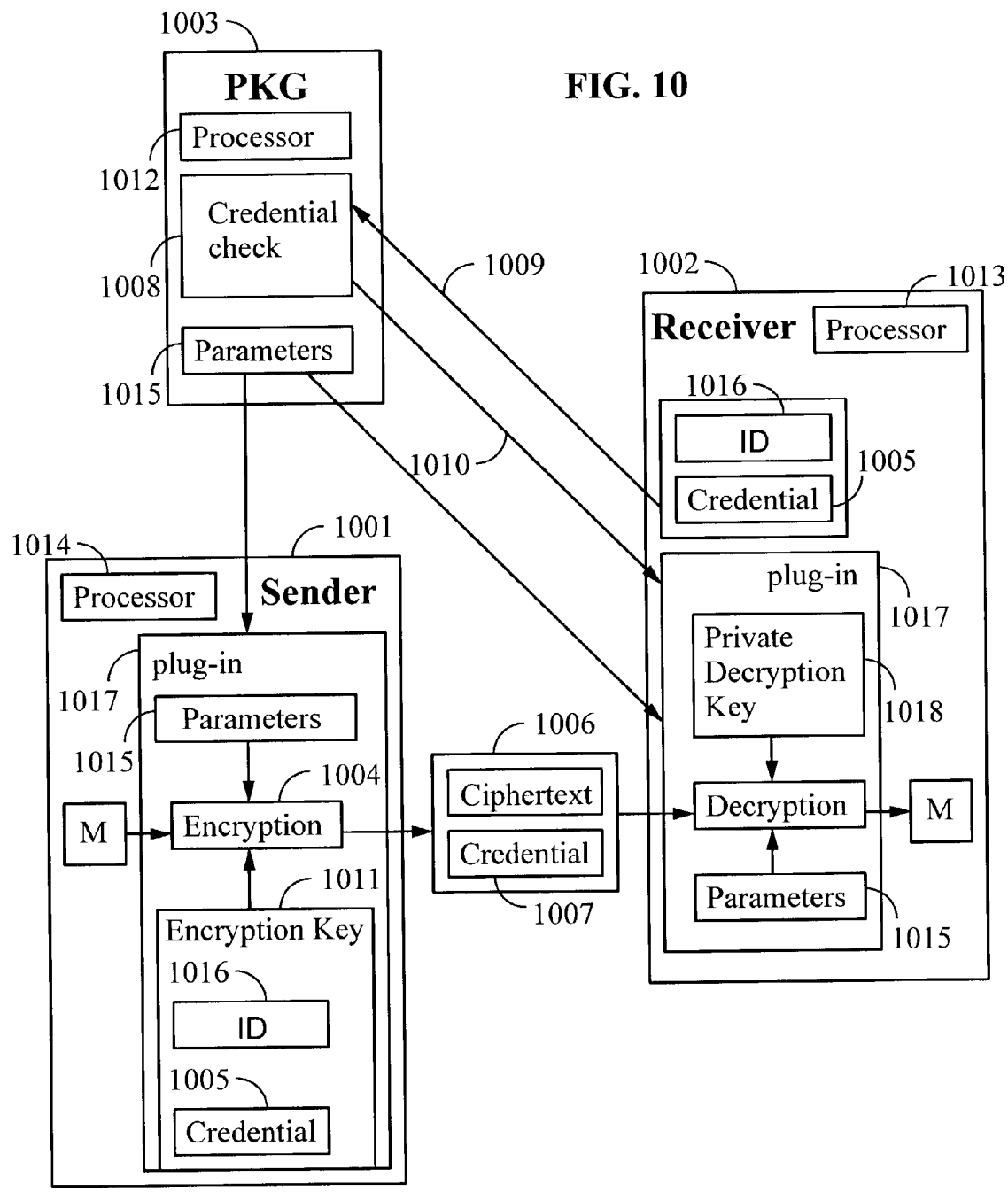
FIG. 10 is a block diagram illustrating a system for managing credentials in an identity based encryption system according to an embodiment of the invention.

FIG. 10 is a block diagram illustrating a system for managing credentials in an identity based encryption system according to an embodiment of the invention. The system includes sender system 1001, receiver system 1002 and PKG 1003. Each such system may be implemented as a computer system such as a client or server connected to a computer network. Accordingly, sender 1001, receiver 1002 and PKG 1003 may each contain processors, such as processor 1014, processor 1013 and processor 1012. Additionally, these systems may include computer-readable storage media, such as computer memory, and may additionally include interfaces to a computer network, including technology allowing for communication with a wired, wireless or other network. Sender system 1001 may include a software plug-in 1017. Such a plug-in may comprise a software module which performs cryptographic functions. The plug-in includes, according to an embodiment of the invention, items such as cryptographic logic 1004. Plug-in 1017 may be distributed to various computers such as sender system 1001 and receiver system 1002 through a network in order to roll out functionality associated with identity-based encryption and other communication functionality. Parameters 1015 from a system such as PKG 1003 are also distributed over a computer network or other communications medium to senders and receivers, such as sender system 1001 and receiver system 1002, who may then use them in conjunction with plug-in 1017 when encrypting or decrypting messages. In one embodiment, plug-in 1017 is distributed together with parameters 1014. In an alternate embodiment, parameters 1015 may be distributed separately.

Sender system 1001 encrypts a message M using encryption logic 1004 in plug-in 1017. Encryption logic 1004 encrypts the message using encryption key 1011, which is based on selected credential 1005 and an identification 1016 of the intended receiver of the message. In some embodiments, the key may be based on other information as well. The sender system 1001 sends the receiver system 1002 information 1006, e.g., in the form of a data packet transmitted over a network or other communication medium. The information 1006 sent to receiver system 1002 contains the encrypted message and may also contain information 1007 regarding the credential 1005 used as part of the basis for the encryption key.

Either before or after receiving information 1006, receiver system 1002 sends a request 1009 to PKG 1003. In one embodiment, the request 1009 may include the receiver's identity 1016 and may also include information related to the selected credential 1005. In response, PKG 1003 verifies the credential of receiver 1002 using credential check logic 1008. Such logic may be implemented in software, hardware or a combination thereof. If the credential is verified as belonging to the receiver, then PKG 1003 provides a response 1010 to receiver 1002, which includes a private decryption key 1018 corresponding to the encryption key 1011. Using the private decryption key, the receiver then may decrypt the encrypted message contained in information 1006 to recover the original message M. Thus, by including a credential as part of an encryption key, embodiments such as this one allow a sender to encrypt a message intended for a receiver, where the decryption of the message by the receiver is contingent upon the validity of the receiver's credential.

Delegation of Decryption Keys

Another application for embodiments of IBE systems is delegation of decryption capabilities. We give two exemplary embodiments, described with reference to a user Bob who plays the role of the PKG. Bob runs the setup algorithm to generate his own IBE system parameters params and his own master-key. Here we view params as Bob's public key.

Bob obtains a certificate from a CA for his public key params. When Alice wishes to send mail to Bob she first obtains Bob's public key params from Bob's public key certificate. Note that Bob is the only one who knows his master-key and hence there is no key-escrow with this setup.

Figure 11:
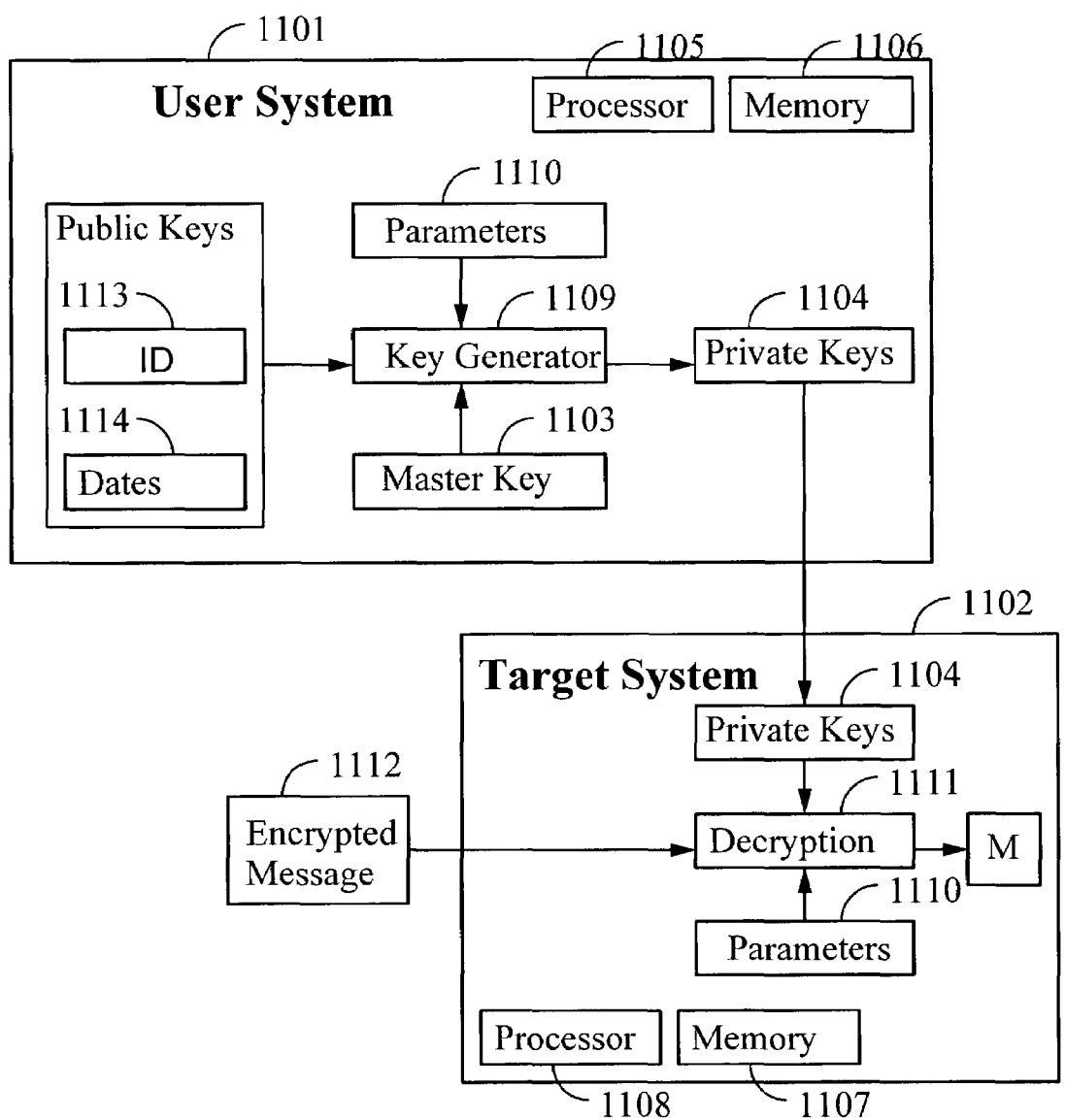
FIG. 11 is a block diagram illustrating a system with key delegation according to an embodiment of the invention.

1. Delegation to a laptop. Suppose Alice encrypts mail to Bob using the current date as the IBE encryption key (she uses Bob's params as the IBE system parameters). Since Bob has the master-key he can extract the private key corresponding to this IBE encryption key and then decrypt the message. Now, suppose Bob goes on a trip for seven days. Normally, Bob would put his private key on his laptop. If the laptop is stolen the private key is compromised. When using the IBE system Bob could simply install on his laptop the seven private keys corresponding to the seven days of the trip. If the laptop is stolen, only the private keys for those seven days are compromised. The master-key is unharmed. FIG. 11 is a block diagram illustrating a system with key delegation according to an embodiment of the invention. The system includes user system 1101 and target system 1102. The target system may comprise a computer such as a laptop computer. User system 1101 includes a master key 1103, which is used to generate decryption keys 1104. The decryption keys 1104 are downloaded to the target system 1102. Using the techniques of key revocation described above, these decryption keys may be valid only for a limited time, thus providing additional security in the event that target system 1101 is compromised. User system 1101 and target system 1102 may include elements of computer systems such as memory 1106 and 1107 as well as processor 1105 and 1108. User system 1101 includes key generator logic 1109, which uses master key 1103 and system parameters 1110 to generate private decryption keys 1104 based on information derived from a user ID 1113 and one or more dates 1114 or other time stamps. Target system 1102 includes decryption logic 1111, which uses the private decryption keys 1104 obtained from user system 1101 and system parameters 1110 to decrypt an incoming encrypted message 1112. If message 1112 is encrypted using public keys based on ID 1113 and one of the dates 1114, then private decryption keys may be used to decrypt it. Thus the decryption capabilities of target system 1102 may be limited to messages associated with selected dates 1114. In an alternate embodiment, the target system may be a data storage medium or portable data storage device which can be connected as desired to other computer systems, thereby enabling use of the decryption keys on those systems.

2. Delegation of duties. Suppose Alice encrypts mail to Bob using the subject line as the IBE encryption key. Bob can decrypt mail using his master-key. Now, suppose Bob has several assistants each responsible for a different task (e.g. one is 'purchasing', another is 'human-resources', etc.). In this embodiment, Bob may give one private key to each of his assistants corresponding to the assistant's responsibility. Each assistant can then decrypt messages whose subject line falls within its responsibilities, but it cannot decrypt messages intended for other assistants. Note that Alice only obtains a single public key from Bob (params), and she uses that public key to send mail with any subject line of her choice. The mail can only be read by the assistant responsible for that subject. More generally, embodiments of IBE can simplify various systems that manage a large number of public keys. Rather than storing a big database of public keys the system can either derive these public keys from user names, or simply use the integers 1, . . . , n as distinct public keys. For example, in a corporation, each employee might have a unique employee number, and that number may serve also as the employee's public key.

Return Receipt

Figure 12:
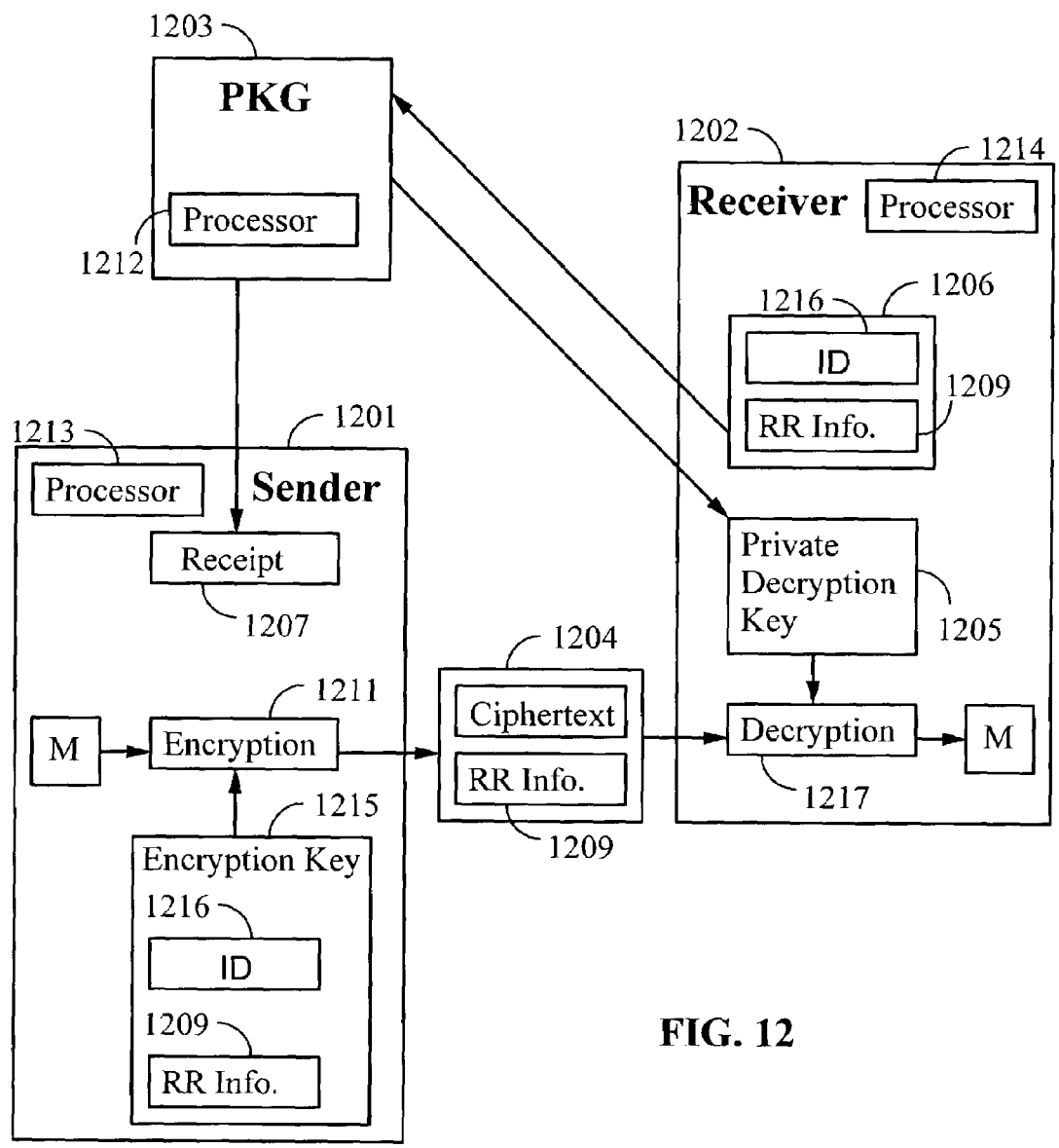
FIG. 12 is a block diagram illustrating an encryption system with return receipt according to an embodiment of the invention.

FIG. 12 is a block diagram illustrating an encryption system with return receipt according to an embodiment of the invention. According to one embodiment of the invention, a sender can receive an confirmation that the recipient has received an encrypted message. More generally, upon receipt of a request for a decryption key from a receiver, the PKG takes an action separate from providing a decryption key to the receiver. Such an action comprises providing an acknowledgement to the sender that indicates that the message was received, according to one embodiment.

An embodiment of a system having return receipt capability is illustrated in FIG. 12. The system includes sender system 1201, recipient system 1202 and PKG system 1203. The sender system 1201, receiver system 1202 and PKG system 1203 may be implemented as computer systems coupled to a computer network. For example, PKG 1203, sender system 1201 and receiver system 1202 may include processor 1212, processor 1213 and processor and 1214, respectively. These computer systems may include elements such as computer readable storage media, computer memory and other storage devices. Additionally, these systems may include interfaces to a computer network, including technology allowing for communication from a wired, wireless or other network. Further, according an embodiment of the invention, communication between the respective elements may take place using data packets sent over a computer network, or using any of various other forms of electronic and data transmission and communication.

The sender 1201 encrypts a message M and sends the resulting ciphertext to receiver 1202 in a data package 1204 that also may include return receipt request information 1209. The return receipt request information may contain, for example, a return address and a message identifier corresponding to the particular message 1204. The message M is encrypted by the sender using encryption logic 1211 and an encryption key 1215. Encryption key 1215 may be based on a receiver ID (such as all e-mail address) 1216 and the return receipt request information 1209. Because the receiver ID and return receipt request information 1209 are used by the sender to determine the encryption key 1215, the receiver 1202 needs a corresponding decryption key that can be used to decrypt the message. Accordingly, recipient system 1202, in response to receiving message 1204, sends PKG 1203 a request 1206, which includes the return receipt request information 1209 and the receiver's ID, 1216. In response, PKG 1203 sends to receiver 1202 the private decryption key 1205, which receiver then uses with decryption logic 1217 to decrypt the ciphertext of message 1204 and recover the original message M. In addition to sending receiver 1202 the decryption key 1205, PKG 1203 also sends a return receipt 1207 to sender 1201. PKG 1203 may alternatively store the receipt on storage media as part of a log rather than send a return receipt. Return receipt 1207 may include information such as the message identifier. Thus, sender 1201 receives proof that recipient 1202 has received the message 1204. The system may be initialized by placing plug-in software in various systems, such as sender system 1201 and receiver system 1202. Such plug-in software may include system parameters, some of which may be derived from a system master key. Such parameters, stored in local devices such as sender 1201 and receiver 1202 are then used to generate encryption keys, perform encryption, perform decryption, and other functions, as appropriate.

SMALL CAPS: DESCRIPTION OF THE WEIL PAIRING

In this section we describe the Weil pairing on elliptic curves and then show how to efficiently compute it using an algorithm. To be concrete we present an example using supersingular elliptic curves defined over a prime field $\mathbb{F}_p$ with p>3 (the curve $y^2=x^3+1$ over $\mathbb{F}_p$ with p=2 mod 3 is an example of such a curve). The following discussion easily generalizes to computing the Weil pairing over other elliptic curves.

Elliptic Curves and the Weil Pairing

We state a few elementary facts about supersingular elliptic curves defined over a prime field $\mathbb{F}_p$ with p>3:

Fact 1: A supersingular curve $E/\mathbb{F}_p$ (with p>3) contains p+1 points in $\mathbb{F}_p$. We let O denote the point at infinity. The group of points over $\mathbb{F}_p$ forms a cyclic group of order p+1. For simplicity, let P be a generator of this group and set n=p+1.

Fact 2: The group of points $E(\mathbb{F}_{p^2})$ contains a point Q of order n which is linearly independent of the points in $E(\mathbb{F}_p)$. Hence, $E(\mathbb{F}_{p^2})$ contains a subgroup which is isomorphic to the group $\mathbb{Z}_n^2$. The group is generated by $P \in E(\mathbb{F}_{p^2})$ and $Q \in E(G_p^2)$. We denote this group by $E[p+1]=E[n]$.

We will be working with the Weil pairing e which maps pairs of points in E[n] into $\mathbb{F}_{p^2}^*$, i.e. e: $E[n] \times E[n] \to \mathbb{F}_{p^2}^*$. To describe the pairing, we review the following concepts:

Divisors A divisor is a formal sum of points on the curve $E(\mathbb{F}_{p^2})$. We write divisors as $$A = \sum_P a_P(P)$$

where $a_P \in \mathbb{Z}$ and $P \in E(\mathbb{F}_{p^2})$. For example, $A=3(P_1)-2(P_2)-(P_3)$ is a divisor. We will only consider divisors $$A = \sum_P a_P(P) \text{ where}$$

$$\sum_P a_P = 0.$$

Functions Roughly speaking, a function $f$ on the curve $E(\mathbb{F}_{p^2})$ can be viewed as a rational function $f(x,y) \in \mathbb{F}_{p^2}(x,y)$. For any point $P=(x,y) \in E(\mathbb{F}_{p^2})$ we define $f(P)=f(x, y)$.

Divisors of functions Let $f$ be a function on the curve $E(\mathbb{F}_{p^2})$. We define its divisor, denoted by $(f)$, as $$(f) = \sum_P ord_P(f) \cdot P.$$

Here $ord_P(f)$ is the order of the zero that $f$ has at the point P. For example, let ax+by+c=0 be the line passing through the points $P_1, P_2 \in E(\mathbb{F}_{p^2})$ with $P_1 \neq \pm P_2$. This line intersects the curve at third point $P_3 \in E(\mathbb{F}_{p^2})$. Then the function $f(x,y)=ax+by+c$ has three zeroes $P_1, P_2, P_3$ and a pole of order 3 at infinity. The divisor of $f$ is $(f)=(P_1)+(P_2)+(P_3)-3(O)$.

Principal divisors Let $A$ be a divisor. If there exists a function $f$ such that $(f)=A$ then we say that $A$ is a principal divisor. We know that a divisor $$A = \sum_P a_P(P)$$

is principal if and only if $$\sum_P a_P = 0 \text{ and}$$

$$\sum_P a_P P = O.$$

Note that the second summation is using the group action on the curve. Furthermore, given a principal divisor $A$ there exists a unique function $f$ (up to constant multiples) such that $(A)=(f)$.

Equivalence of divisors We say that two divisors $A, B$ are equivalent if their difference $A-B$ is a principal divisor. We know that any divisor $$A = \sum_P a_P(P) \left(\text{with } \sum_P a_P = 0\right)$$

is equivalent to a divisor of the form $A'=(Q)-(O)$ for some $Q \in E$. Observe that $$Q = \sum_P a_P P.$$

Notation Given a function $f$ and a divisor $$A = \sum_P a_P(P)$$

we define $f(A)$ as $f(A) = \Pi_P f(P)^{a_P}$. Note that since $$\sum_P a_P = 0$$

we have that $f(A)$ remains unchanged if instead of $f$ we use $cf$ for any $c \in \mathbb{F}_{p^2}$.

We are now ready to describe the Weil pairing of two points $P, Q \in E[n]$. Let $A_P$ be some divisor equivalent to the divisor $(P)-(O)$. We know that $nA_P$ is a principal divisor (it is equivalent to $n(P)-n(O)$ which is clearly a principal divisor). Hence, there exists a function $f_P$ such that $(f_P)=nA_P$. Define $A_Q$ and $f_Q$ analogously. The Weil pairing of P and Q is given by:

$$e(P, Q) = \frac{f_P(A_Q)}{f_Q(A_P)}$$

This ratio provides the value of the Weil pairing of P and Q whenever it is well defined (i.e., whenever no division by zero has occurred). If this ratio is undefined we use different divisors $\mathcal{A}_P$, $\mathcal{A}_Q$ to define e(P,Q). When P,Q∈E($\mathbb{F}_{p^2}$) we have that e(P,Q)∈$\mathbb{F}_{p^2}$.

We briefly show that the Weil pairing is well defined. That is, the value of e(P,Q) is independent of the choice of the divisor $\mathcal{A}_P$ as long as $\mathcal{A}_P$ is equivalent to (P)−(O) and $\mathcal{A}_P$ leads to a well defined value. The same holds for $\mathcal{A}_Q$. Let $\mathcal{\hat{A}}_P$ be a divisor equivalent to $\mathcal{A}_P$ and let $\hat{f}_P$ be a function so that $(\hat{f}_P)$=n$\mathcal{\hat{A}}_P$. Then $\mathcal{\hat{A}}_P$=$\mathcal{A}_P$+(g) for some function g and $\hat{f}_P$=$f_P \cdot g^n$. We have that:

$$e(P,Q) = \frac{\hat{f}_P(\mathcal{A}_Q)}{f_Q(\mathcal{\hat{A}}_P)} = \frac{f_P(\mathcal{A}_Q)(g(\mathcal{A}_Q))^n}{f_Q(\mathcal{A}_P)f_Q((g))} = \frac{f_P(\mathcal{A}_Q)}{f_Q(\mathcal{A}_P)} \cdot \frac{g(n\mathcal{A}_Q)}{f_Q((g))} = \frac{f_P(\mathcal{A}_Q)}{f_Q(\mathcal{A}_P)} \cdot \frac{g((f_Q))}{f_Q((g))} = \frac{f_P(\mathcal{A}_Q)}{f_Q(\mathcal{A}_P)}$$

The last equality follows from the following fact known as Weil reciprocity: for any two functions $f$,g we have that $f((g))=g((f))$. Hence, the Weil pairing is well defined.

Fact 10 The Weil pairing has the following properties:
  For all P∈E[n] we have: e (P,P)=1.
  Bilinear: $e(P_1+P_2,Q)=e(P_1, Q) \cdot e(P_2, Q)$ and $e(P,Q_1+Q_2)=e(P,Q_1) \cdot e(P,Q_2)$.
  When P,Q∈E[n] are collinear then e(P,Q)=1. Similarly, $e(P,Q)=e(Q, P)^{-1}$.
  n'th root: for all P,Q∈E[n] we have $e(P,Q)^n$=1.
  Non-degenerate: if P satisfies e(P, Q)=1 for all Q∈E[n] then P=O.

As discussed earlier, our detailed example of an embodiment of an IBE scheme uses the modified Weil pairing ê(P, Q)=e(P, φ(Q)), where φ is an automorphism on the group of points of E.

Tate pairing. The Tate pairing is another bilinear pairing that has the required properties for embodiments of our system. In various embodiments, we slightly modify the original definition of the Tate pairing to fit our purpose. Define the Tate pairing of two points P,Q∈E[n] as $T(P,Q)=f_P(\mathcal{A}_Q)|\mathbb{F}_{p^*}^{2l/n}$ where $f_P$ and $\mathcal{A}_Q$ are defined as earlier. This definition gives a computable bilinear pairing T: E[n]×E[n]→$\mathbb{G}_2$.

Computing the Weil Pairing

Given two points P, Q∈E[n] we show how to compute e(P, Q)∈$\mathbb{F}_{p^2}^*$ using O(log p) arithmetic operations in $\mathbb{F}_p$. We assume P≠Q. We proceed as follows: pick two random points $R_1, R_2$∈E[n]. Consider the divisors $\mathcal{A}_P$=(P+$R_1$)−($R_1$) and $\mathcal{A}_Q$=(Q+$R_2$)−($R_2$). These divisors are equivalent to (P)−(O) and (Q)−(O) respectively. Hence, we can use $\mathcal{A}_P$ and $\mathcal{A}_Q$ to compute the Weil pairing as:

$$e(P,Q) = \frac{f_P(\mathcal{A}_Q)}{f_Q(\mathcal{A}_P)} = \frac{f_P(Q+R_2)f_Q(R_1)}{f_P(R_2)f_Q(P+R_1)}$$

This expression is well defined with very high probability over the choice of $R_1, R_2$ (the probability of failure is at most $$O\left(\frac{\log p}{p}\right).$$

In the rare event that a division by zero occurs during the computation of e(P, Q) we simply pick new random points $R_1, R_2$ and repeat the process.

To evaluate e(P, Q) it suffices to show how to evaluate the function $f_P$ p at $\mathcal{A}_Q$. Evaluating $f_Q(\mathcal{A}_P)$ is done analogously. We evaluate $f_P(\mathcal{A}_Q)$ using repeated doubling. For a positive integer b define the divisor $$\mathcal{A}_b = b(P+R_1) - b(R_1) - (bP) + (O)$$

It is a principal divisor and therefore there exists a function $f_b$ such that $(f_b)=\mathcal{A}_b$. Observe that $(f_P)=(f_n)$ and hence, $f_P(\mathcal{A}_Q)=f_n(\mathcal{A}_Q)$. It suffices to show how to evaluate $f_n(\mathcal{A}_Q)$.

Lemma 11 There is an algorithm $\mathcal{D}$ that given $f_b(\mathcal{A}_Q)$, $f_c(\mathcal{A}_Q)$ and bP,cP, b+c)P for some b, c>0 outputs $f_{b+c}(\mathcal{A}_Q)$. The algorithm only uses a (small) constant number of arithmetic operations in $\mathbb{F}_{p^2}$.

Proof We first define two auxiliary linear functions $g_1, g_2$:
  1. Let $a_1x+b_1y+c_1=0$ be the line passing through the points bP and cP (if b=c then let $a_1x+b_1y+c_1=0$ be the line tangent to E at bP). Define $g_1(x,y)=a_1x+b_1y+c_1$.
  2. Let $x+c_2=0$ be the vertical line passing through the point (b+c)P. Define $g_2(x,y)=x+c_2$ The divisors of these functions are:

$$(g_1)=(bP)+(cP)+(-(b+c)P)-3(O)$$

$$(g_2)=((b+c)P)+(-(b+c)P)-2(O)$$

By definition we have that:

$$\mathcal{A}_b = b(P+R_1) - b(R_1) - (bP) + (O)$$

$$\mathcal{A}_c = c(P+R_1) - c(R_1) - (cP) + (O)$$

$$\mathcal{A}_{b+c} = (b+c)(P+R_1) - (b+c)(R_1) - ((b+c)P) + (O)$$

It now follows that:

$$\mathcal{A}_{b+c} = \mathcal{A}_b + \mathcal{A}_c + (g_1) - (g_2).$$

Hence $$f_{b+c}(\mathcal{A}_Q) = f_b(\mathcal{A}_Q) \cdot f_c(\mathcal{A}_Q) \cdot \frac{g_1(\mathcal{A}_Q)}{g_2(\mathcal{A}_Q)} \quad (1)$$

This shows that to evaluate $f_{b+c}(\mathcal{A}_Q)$ it suffices to evaluate $g_i(\mathcal{A}_Q)$ for all i=1, 2 and plug the results into equation 1. Hence, given $f_b(\mathcal{A}_Q)$, $f_c(\mathcal{A}_Q)$ and bP, cP, (b+c)P one can compute $f_{b+c}(\mathcal{A}_Q)$ using a constant number of arithmetic operations. □

Denote the output of Algorithm $\mathcal{D}$ of Lemma 11 by $\mathcal{D}(f_b(\mathcal{A}_Q), f_c(\mathcal{A}_Q), bP,cP,(b+c)P)=f_{b+c}(\mathcal{A}_Q)$. Then one can compute $f_P(\mathcal{A}_Q)=f_n(\mathcal{A}_Q)$ using the following standard repeated doubling procedure. Let n=$b_m b_{m-1} \ldots b_1 b_0$ be the binary representation of n, i.e. n=

$$\sum_{i=0}^{m} b_i 2^i.$$

Init: Set Z=O, V=$f_0(\mathcal{A}_Q)$=1, and k=0.
Iterate: For i =m, m−1, . . . , 1, 0 do:
  1: If $b_i$=1 then do: Set V=$\mathcal{D}(V,f_1(\mathcal{A}_Q), Z, P, Z+P)$, set Z=Z+P, and set k=k+1.

2: If i>0 set V=𝔇(V, V, Z, Z, 2Z), set Z=2Z, and set k=2k.

3: Observe that at the end of each iteration we have z=kP and V=$f_k(A_Q)$.

Output: After the last iteration we have k=n and therefore V=$f_n(A_Q)$ as required.

To evaluate the Weil pairing e(P,Q) we run the above algorithm once to compute $f_P(A_Q)$ and once to compute $f_Q(A_P)$. Note that the repeated squaring algorithm needs to evaluate $f_1(A_Q)$. This is easily done since the function $f_1(x,y)$ (whose divisor is $(f_1,=(P+R_1)-(R_1)-(P)+(O))$) can be written out explicitly as follows:

1. Let $a_1x+b_1y+c_1=0$ be the line passing through the points P and $R_1$. Define the function: $g_1(x,y)=a_1x+b_1y+c_1$.
2. Let $x+c_2=0$ be the vertical line passing through the point $P+R_1$. Define the function: $g_2(x,y)=x+c_2$.
3. The function $f_1(x,y)$ is simply $f_1(x,y)=g_2(x,y)/g_1(x,y)$ which is easy to evaluate in $\mathcal{G}_{p^2}$.

The inventors claim:

1. In a cryptographic system, a method for sharing an identity-based secret message key between a sender and a receiver, the method comprising:
    (a) at a private key generator: obtaining an element Q of a first algebraic group, wherein Q represents an identity-based public encryption key of the receiver; computing sQ, where s is an integer representing a secret master key, and where sQ represents a private decryption key of the receiver; sending sQ to the receiver; obtaining an element P of a second algebraic group; computing sP; and sending sP to the sender;
    (b) at the sender: obtaining the element Q; obtaining the element P; obtaining an element sP from the private key generator; selecting a secret $r \in \mathbb{Z}$; computing rP; computing the secret message key from r, sP, Q, and a bilinear map; and sending rP to the receiver;
    (c) at the receiver: obtaining rP from the sender; obtaining sQ from the private key generator; and computing the secret message key from rP, sQ, and the bilinear map.

2. The method of claim 1 wherein sP and P are system parameters published by the private key generator.

3. The method of claim 1 wherein the bilinear map is an admissible map.

4. The method of claim 1 wherein the bilinear map is a symmetric map and the first algebraic group is equal to the second algebraic group.

5. The method of claim 1 wherein the bilinear map is an asymmetric map.

6. The method of claim 1 wherein obtaining the element Q at the receiver comprises obtaining a public identifier ID associated with the receiver and computing Q from the ID.

7. A method for generating a decryption key based on a public identifier ID, the method comprising:
    (a) obtaining a master key and a set of system parameters associated with an identity-based encryption system;
    (b) obtaining an element $Q_{ID}$ of an algebraic group, wherein the element $Q_{ID}$ is derived from the public identifier ID; and
    (c) computing the decryption key $d_{ID}$ from the master key and $Q_{ID}$ using an action of the master key on $Q_{ID}$, wherein the decryption key $d_{ID}$ is a member of the algebraic group.

8. The method of claim 7 wherein the algebraic group is a prime-order subgroup of an elliptic curve group.

9. The method of claim 7 wherein computing the decryption key comprises calculating $d_{ID}=sQ_{ID}$, where s represents the master key.

10. The method of claim 7 wherein obtaining the element $Q_{ID}$ comprises: obtaining the public identifier ID; computing the element $Q_{ID}$ from the public identifier ID.

11. The method of claim 7 wherein the public identifier ID is an identifier selected from the group consisting of the finite combinations of: a personal name, a name of an entity, a domain name, an IP address, an email address, a social security number, a passport number, a license number, a serial number, a zip code, an address, a telephone number, a URL, a date, a time, a subject, a case, a jurisdiction, a state, a country, a credential, a security clearance level, and a title.

12. A method for encrypting a message in an identity-based cryptosystem to produce corresponding ciphertext, the method comprising:
    (a) obtaining a set of parameters associated with a cryptographic system, wherein the parameters comprise a bilinear map $\hat{e}: G_0 \times G_1 \rightarrow G_2$, where $G_0$, $G_1$ and $G_2$ are (not necessarily distinct) algebraic groups;
    (b) selecting a public identifier ID comprising information identifying an intended receiver of the message;
    (c) computing an element $Q_{ID} \in G_0$ from the public identifier ID;
    (d) computing a secret message key $g \in G_2$ using $\hat{e}$ and $Q_{ID}$; and
    (e) computing the ciphertext from the message using the message key g.

13. The method of claim 12 wherein computing the ciphertext comprises computing a bit mask from the message key g, and masking the message using the bit mask.

14. The method of claim 12 wherein computing the ciphertext comprises computing a bit mask from a hash of a random bit string σ, masking the message using the bit mask, and masking the random bit string σ using a hash of the secret message key.

15. The method of claim 12 wherein computing the ciphertext comprises computing an element $rP \in G_1$, where $r \in \mathbb{Z}$ is a randomly selected secret, and where $P \in G_1$.

16. The method of claim 12 wherein computing the message key also uses $r \in \mathbb{Z}$, where r is a randomly selected secret.

17. The method of claim 12 wherein computing the secret message key uses an element $sP \in G_1$, where s is a secret master key.

18. The method of claim 12 wherein computing the message key $g \in G_2$ uses multiple elements $sP \in G_1$, where the s are shares of a secret master key.

19. The method of claim 12 wherein computing the element $Q_{ID}$ comprises: using a character encoding scheme to map the public identifier ID to a binary string, and hashing the binary string to the element $Q_{ID}$ of $G_0$.

20. The method of claim 12 wherein $G_0$ and $G_1$ are derived from an elliptic curve defined over a field.

21. The method of claim 20 wherein $\hat{e}$ is derived from a Weil pairing on the elliptic curve.

22. The method of claim 20 wherein $\hat{e}$ is derived from a Tate pairing on the elliptic curve.

23. The method of claim 12 wherein the public identifier ID is an identifier selected from the group consisting of the finite combinations of: a personal name, a name of an entity, a domain name, an IP address, an email address, a social security number, a passport number, a license number, a serial number, a zip code, an address, a telephone number, a URL, a date, a time, a subject, a case, a jurisdiction, a state, a country, a credential, a security clearance level, and a title.

24. A method for decrypting ciphertext in an identity-based cryptosystem to produce an original message, the method comprising:
(a) obtaining a set of parameters associated with a cryptographic system, wherein the parameters comprise a bilinear map ê: $G_0 \times G_1 \to G_2$, where $G_0$, $G_1$ and $G_2$ are (not necessarily distinct) algebraic groups;
(b) selecting a public identifier ID comprising information identifying an intended receiver of the message;
(c) obtaining a private key $d_{ID} \in G_0$ corresponding to the public identifier ID;
(d) computing a secret message key $g \in G_2$ using ê and the private key $d_{ID}$; and
(e) computing the original message from the ciphertext using the message key g.

25. The method of claim 24 wherein computing the original message comprises computing a bit mask from the message key, and unmasking the ciphertext using the bit mask.

26. The method of claim 24 wherein computing the original message comprises unmasking a random bit string or using a hash of the message key, and unmasking the message using a hash of the random bit string σ.

27. The method of claim 24 wherein the private key $d_{ID} \in G_1$ is derived from $Q_{ID}$ and a secret master key s.

28. The method of claim 24 wherein obtaining the private key $d_{ID} \in G_1$ comprises providing authentication of identity to a private key generator and receiving the private key from the private key generator.

29. The method of claim 24 wherein obtaining the private key $d_{ID} \in G_0$ corresponding to the public identifier ID comprises obtaining multiple private key portions $d \in G_0$ from multiple corresponding private key generators.

30. The method of claim 24 wherein $G_0$, $G_1$ and $G_2$ are cyclic groups having orders divisible by a prime number q.

31. The method of claim 24 wherein $G_0$ and $G_1$ are (not necessarily proper) subgroups of an elliptic curve defined over a field.

32. The method of claim 31 wherein ê is derived from a Weil pairing on the elliptic curve.

33. The method of claim 31 wherein ê is derived from a Tate pairing on the elliptic curve.

34. The method of claim 24 wherein the public identifier ID is an identifier selected from the group consisting of the finite combinations of: a personal name, a name of an entity, a domain name, an IP address, an email address, a social security number, a passport number, a license number, a serial number, a zip code, an address, a telephone number, a URL, a date, a time, a time interval, a subject, a case, a jurisdiction, a state, a country, a credential, a security clearance level, and a title.

35. A method for encrypting a message to produce ciphertext, the method comprising:
(a) obtaining a set of parameters associated with a cryptographic system, wherein the parameters comprise a bilinear map ê: $G_1 \times G_1 \to G_2$, where $G_1$ and $G_2$ are algebraic groups, and elements P, sP $\in G_1$, where s $\in Z$ is a secret master key;
(b) obtaining a public key xP $\in G_1$ corresponding to an intended receiver, where x $\in Z$ is a secret of the intended receiver;
(c) computing a message key g $\in G_2$ using ê, sP, the public key xP, and a randomly selected secret r $\in Z$; and
(d) computing the ciphertext from the message using the message key g.

36. A method for decrypting a ciphertext to produce message, the method comprising:
(a) obtaining a set of parameters associated with a cryptographic system, wherein the parameters comprise a bilinear map ê: $G_1 \times G_1 \to G_2$, where $G_1$ and $G_2$ are algebraic groups, and elements P, sP $\in G_1$, where s $\in Z$ is a secret master key;
(b) computing a message key g $\in G_2$ using ê, sP, a private key x and an element rP $\in G_1$ received from a sender, where r $\in Z$ is a secret of the sender; and
(c) computing the message from the ciphertext using the message key g.

37. A method for decrypting a ciphertext to produce a message, the method comprising:
(a) obtaining a secret master key s $\in Z$ and a set of parameters associated with a cryptographic system, wherein the parameters comprise an admissible map ê: $G_1 \times G_1 \to G_2$, where $G_1$ and $G_2$ are algebraic groups;
(b) obtaining a public key xP $\in G_1$ corresponding to an intended receiver of the message, where x $\in Z$ is a secret of the intended receiver;
(c) computing a message key g $\in G_2$ using ê, the public key xP, the secret master key s, and an element rP $\in G_1$ received from a sender, where r $\in Z$ is a secret of the sender; and
(d) computing the message from the ciphertext using the message key g.

38. A method for encrypting an e-mail message addressed to a receiver, the method comprising:
(a) obtaining a set of parameters associated with a cryptographic system, wherein the parameters comprise a bilinear map ê: $G_0 \times G_1 \to G_2$, where $G_0$, $G_1$ and $G_2$ are algebraic groups;
(b) selecting a public identifier ID comprising an e-mail address of the receiver;
(c) computing an element $Q_{ID} \in G_0$ corresponding to the public identifier ID;
(d) computing a message key g $\in G_2$ using ê, $Q_{ID}$ and a randomly selected secret r $\in Z$; and
(e) computing an encrypted message from the message using the message key g.

39. The method of claim 38 wherein the public identifier ID further comprises an identifier selected from the group consisting of: a personal name, a name of an entity, a domain name, an IP address, a social security number, a passport number, a license number, a serial number, a zip code, an address, a telephone number, a URL, a date, a time, a subject, a case, a jurisdiction, a state, a country, a credential, a security clearance level, and a title.

40. A computer-readable storage medium having stored thereon ciphertext comprising: a first component representing an element computed from a randomly selected secret integer of a sender, and a second component representing a message encrypted by the sender using a secret message key, wherein the secret message key computed by the sender using a bilinear map, the secret integer, and an identity-based public key of an intended receiver.

41. A method of encrypting a first piece of information to be sent by a sender to a receiver, the method comprising: providing a second piece of information; generating an encryption key from the second piece of information; and using a bilinear map and the encryption key to encrypt at least a portion of the first piece of information to be sent from the sender to the receiver.

42. The method of claim 41 wherein the bilinear map is symmetric.

43. The method of claim 41 wherein the bilinear map is admissible.

44. The method of claim 41 wherein the bilinear map is based on a Weil pairing.

45. The method of claim 41 wherein the bilinear map is based on a Tate pairing.

46. The method of claim 41 wherein the second piece of information includes information associated with the receiver.

47. The method of claim 41 wherein the second piece of information comprises an e-mail address.

48. The method of claim 41 wherein the second piece of information includes information corresponding to a time.

49. The method of claim 41 wherein the second piece of information includes a message identifier.

50. The method of claim 41 wherein the second piece of information includes a credential identifier.

51. The method of claim 41 wherein the second piece of information includes a subject identifier for the message.

52. A method of decrypting ciphertext encrypted by a sender with an identity-based encryption key associated with a receiver, the method comprising: obtaining a decryption key derived from the encryption key; and using a bilinear map and the decryption key to decrypt at least a portion of the ciphertext.

53. The method of claim 52 wherein the bilinear map is symmetric.

54. The method of claim 52 wherein the bilinear map is admissible.

55. The method of claim 52 wherein the bilinear map is based on a Weil pairing.

56. The method of claim 52 wherein the bilinear map is based on a Tate pairing.

57. The method of claim 52 further comprising: obtaining the ciphertext prior to obtaining the decryption key.

58. The method of claim 52 wherein obtaining the decryption key comprises sending a request to a private key generator, wherein the request comprises information sent by a sender together with the ciphertext.

59. A method of generating a decryption key corresponding to an encryption key, wherein the encryption key is based on a first piece of information, the method comprising: providing an algebraic group having a group action; providing a master key; generating the encryption key based on the first piece of information; and generating the decryption key based on the group action applied to the master key and the encryption key.

60. The method of claim 59 wherein the algebraic group is defined by at least a portion of an elliptic curve.

61. The method of claim 59 wherein the first piece of information comprises information associated with an entity.

62. The method of claim 59 wherein the first piece of information comprises an e-mail address.

63. The method of claim 59 wherein the decryption key is generated in response to a request from a receiver of an encrypted message, and the first piece of information includes a message identifier.

64. The method of claim 59 wherein the decryption key is generated in response to a request from a receiver and the first piece of information includes an attribute associated with the receiver.

65. The method of 59 wherein the first piece of information includes information corresponding to a time.

66. The method of claim 59 wherein the first piece of information includes information corresponding to a time, wherein the decryption key is generated on a user system, and wherein the method further comprises storing the decryption key on a target system.

67. The method of claim 59 wherein the first piece of information includes information corresponding to a responsibility; and wherein the method further comprises providing respective decryption keys to an entity associated with the responsibility.

68. The method of claim 59 further comprising receiving a request for the decryption key from a receiver, and providing the key to the receiver if the receiver is authenticated.

69. The method of claim 59 wherein the master key is a share of a shared master key.

70. A method of providing system parameters for a cryptographic system comprising: providing a system parameter representing an algebraic group $G_1$ and an algebraic group $G_2$; and providing a system parameter representing a bilinear map ê mapping pairs of elements of $G_1$ to elements of $G_2$.

71. The method of 70 wherein the bilinear map is symmetric.

72. The method of 70 wherein the bilinear map is based on a Weil pairing.

73. The method of 70 wherein the bilinear map is based on a Tate pairing.

74. The method of 70 wherein the algebraic group $G_1$ is derived from at least a portion of an elliptic curve.

75. The method of claim 70 wherein the algebraic group $G_1$ is derived from at least a portion of the elliptic curve $y^2=x^3+1$.

76. A method for communicating between a sender and a receiver, the method comprising: encrypting a message to be sent from the sender to the receiver using an encryption key derived in part from a message identifier; sending the encrypted message from the sender to the receiver; receiving a request from the receiver for a decryption key, wherein the request includes the message identifier; after receiving the request for the decryption key, generating receipt information indicating that the receiver has received the message, and providing the decryption key to the receiver.

77. The method of claim 76 comprising: sending to the sender the generated receipt information.

78. The method of claim 76 wherein the encryption key is derived in part from an identifier associated with the sender.

79. The method of claim 76 wherein the encryption key is derived in part from an identifier associated with the receiver.

80. A method for communicating between a sender and a receiver, the method comprising: obtaining identifying information of the receiver; specifying a credential required for the receiver to gain a decryption key; deriving an encryption key from the identifying information of the receiver and the credential; encrypting a message using the encryption key and a bilinear map; sending the encrypted message from a sender to the receiver; receiving a request from the receiver of the message for a decryption key; determining whether the receiver has the credential; if the receiver has the credential, providing the decryption key to the receiver; decrypting the encrypted message using the decryption key and the bilinear map.

81. A system for encrypting a message in an identity-based cryptosystem to produce corresponding ciphertext, the system comprising:
- (a) a resource that obtains a set of parameters associated with a cryptographic system, wherein the parameters comprise a bilinear map $\hat{e}: G_0 \times G_1 \rightarrow G_2$, where $G_0$, $G_1$ and $G_2$ are (not necessarily distinct) algebraic groups;
- (b) a resource that selects a public identifier ID comprising information identifying an intended receiver of the message;
- (c) a resource that computes an element $Q_{ID} \in G_0$ from the public identifier ID;
- (d) a resource that computes a secret message key $g \in G_2$ using $\hat{e}$ and $Q_{ID}$; and
- (e) a resource that computes the ciphertext from the message using the message key g.

82. An electronic message comprising ciphertext computed from a message and a message key g, wherein g is generated by:
- (a) obtaining a set of parameters associated with a cryptographic system, wherein the parameters comprise a bilinear map $\hat{e}: G_0 \times G_1 \rightarrow G_2$, where $G_0$, $G_1$ and $G_2$ are (not necessarily distinct) algebraic groups;
- (b) selecting a public identifier ID comprising information identifying an intended receiver of the message;
- (c) computing an element $Q_{ID} \in G_0$ from the public identifier ID; and (d) computing the message key $g \in G_2$ using $\hat{e}$ and $Q_{ID}$.

* * * * *

UNITED STATES PATENT AND TRADEMARK OFFICE
CERTIFICATE OF CORRECTION

PATENT NO. : 7,113,594 B2  
APPLICATION NO. : 10/218697  
DATED : September 26, 2006  
INVENTOR(S) : Dan Boneh et al.

Page 1 of 2

It is certified that error appears in the above-identified patent and that said Letters Patent is hereby corrected as shown below:

Column 8, Line 5: Change "$G_0 \times G_1 \rightarrow {}_2$" to --$G_0 \times G_1 \rightarrow G_2$--

Column 14, Line 16: Change "1=1,2" to --i=1,2--

Column 20, Line 25: Change "1-to-1" to --$\ell$-to-1--

Column 20, Line 26: Change "exactly 1" to --exactly $\ell$-- and change "$|L^{-1}(y)|=1$" to --$|L^{-1}(y)|=\ell$--

Column 20, Line 27: Change "$|A|=1|G_1^*|$" to --$|A|= \ell|G_1^*|$--

Column 21, Line 6: Change "1-to-1" to --$\ell$-to-1--

Column 22, Line 8: Change "p=1q+1" to --p= $\ell$q+1--

Column 22, Line 37: Change "p=1q-1" to --p= $\ell$q-1--

Column 22, Line 38: Change "divide 1" to --divide $\ell$--

Column 22, Line 46: Change "1Q" to --$\ell$Q--

Column 22, Line 49: Change "1-to-1" to --$\ell$-to-1--

Column 22, Line 50: Change "1Q" to --$\ell$Q-- and change "$1(x_0,y_0)$" to --$\ell(x_0,y_0)$--

Column 22, Line 51: Change "1)." to --$\ell$).--

Column 22, Line 52: Change "1-1" to --$\ell$-1--

Coumn 22, Line 62: Change "1-to-1" to --$\ell$-to-1--

Column 22, Line 66: Change "1-1" to --$\ell$-1-- and change "$1^{-1}$" to --$\ell^{-1}$--

Column 22, Line 67: Change "$1^{-1}$" to --$\ell^{-1}$-- and change "inverse of 1" to --inverse of $\ell$--

Column 23, Line 1: Change "1 elements" to --$\ell$ elements--

Column 38, Lines 47-48 (Claim 18): Change "$sP \in G_1$, where the sare" to --$s_iP \in G_1$, where the $s_i$ are--

Column 39, Lines 22-23 (Claim 26): Change "bit string or using" to --bit string σ using--

UNITED STATES PATENT AND TRADEMARK OFFICE
CERTIFICATE OF CORRECTION

PATENT NO. : 7,113,594 B2
APPLICATION NO. : 10/218697
DATED : September 26, 2006
INVENTOR(S) : Dan Boneh et al.

It is certified that error appears in the above-identified patent and that said Letters Patent is hereby corrected as shown below:

Column 39, Line 34 (Claim 29): Change "private key portions $d \in G_0$" to --private key portions $d_i \in G_0$--

Signed and Sealed this

Sixth Day of February, 2007

JON W. DUDAS
*Director of the United States Patent and Trademark Office*